United States Patent [19]

Hashimoto

[11] Patent Number: 4,486,522
[45] Date of Patent: Dec. 4, 1984

[54] TETRAZONIUM SALT, NOVEL DISAZO COMPOUND, METHOD OF PREPARING SAME AND ELECTROPHOTOGRAPHIC ELEMENT USING SAME

[75] Inventor: Mitsuru Hashimoto, Numazu, Japan

[73] Assignee: Ricoh Co., Ltd., Tokyo, Japan

[21] Appl. No.: 493,913

[22] Filed: May 12, 1983

[30] Foreign Application Priority Data

May 20, 1982 [JP] Japan .................. 57-86190
Aug. 19, 1982 [JP] Japan .................. 57-142621

[51] Int. Cl.³ .................. G03G 5/06; G03G 5/14
[52] U.S. Cl. .................. 430/79; 430/58; 430/72
[58] Field of Search .................. 430/79, 58, 72; 260/174

[56] References Cited

U.S. PATENT DOCUMENTS 4,293,628 10/1981 Hashimoto .................. 430/58
4,343,882 8/1982 Hashimoto .................. 430/58
4,418,134 11/1983 Patel .................. 430/45

Primary Examiner—John E. Kittle
Assistant Examiner—John L. Goodrow
Attorney, Agent, or Firm—Flynn, Thiel, Boutell & Tanis

[57] ABSTRACT

A novel tetrazonium salt compound having the general formula (II), namely an intermediate useful for synthesis of a wide scope of disazo compounds, was obtained:

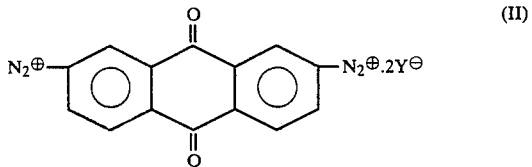

wherein Y is an anion functional group.

A novel disazo compound is further disclosed having the general formula (I):

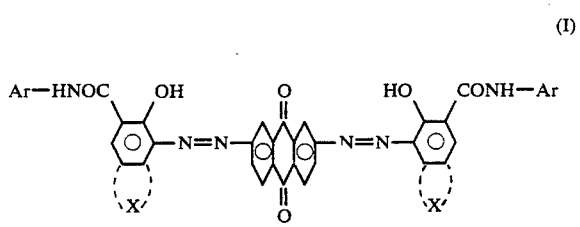

wherein X is a substituted or unsubstituted aromatic ring or hetero ring, and Ar is a substituted or unsubstituted aromatic ring or hetero ring, together with a method for making said disazo compound which comprises using, as a starting material, 2,7-diaminoanthraquinone having the formula (III):

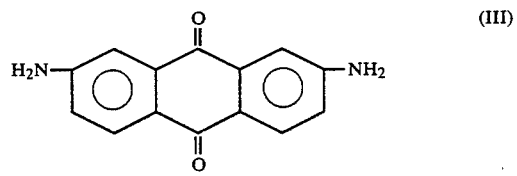

and a coupler having the general formula (IV):

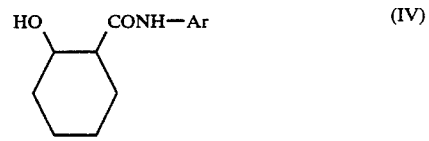

wherein X and Ar are the same as defined above. Further, a multilayer type electrophotographic element comprising a charge carrier generating layer and a charge transfer layer and using, as a charge carrier generating substance, said disazo compound having the general formula (I), was provided.

20 Claims, 4 Drawing Figures

TETRAZONIUM SALT, NOVEL DISAZO COMPOUND, METHOD OF PREPARING SAME AND ELECTROPHOTOGRAPHIC ELEMENT USING SAME

BACKGROUND OF THE INVENTION

1. Field of The Invention

The present invention relates to a novel tetrazonium salt, a novel disazo compound, a method of making same and an electrophotographic element, in particular a multilayer type electrophotographic element which comprises a charge carrier generating layer containing a substance capable of generating charge carriers when exposed to radiation of light (which will be called a charge carrier generating substance hereinafter) and a charge transfer layer containing a substance capable of accepting charge carriers generated from said charge carrier generating layer and transferring them (which will be called a charge transfer layer hereinafter).

2. Description of The Prior Art

As electrophotographic elements there have typically been used inorganic ones using selenium and its alloys or dispersed coloring matter-sensitized zinc oxides in a binder resin, and organic ones using charge transfer complexes of 2,4,7-trinitro-9-fluorenone (which will be called TNF hereinafter) and poly-N-vinylcarbazole (which will be called PVK hereinafter) and the like. However, the fact is that these elements have a number of advantages as well as various disadvantages. For instance, the now widely used selenium element is defective in that the manufacturing conditions are complicated, the production cost is expensive, it is hardly worked into a belt-like form due to lack of flexibility, and attention must be paid in handling because it is very sensitive to heat and mechanical impact. The zinc oxide element is inexpensive because it can be prepared by coating the substrate with a cheap zinc oxide, but defective in that it is generally inferior in sensitivity and mechanical properties such as surface smoothness, tensile strength, friction resistance and the like. Therefore, the zinc oxide element involves various problems such as durability and the like when used repeatedly in plain paper copying machines. And, the element using the charge transfer complex of TNF and PVK is too low in sensitivity to be suitably used in high-speed copying machines.

Of late, a wide range of studies has been carried out in order to eliminate the shortcomings inherent in these elements. In particular, various organic elements have been proposed for that purpose. Among them, multilayer type elements are attracting public attention as elements for use in plain paper copying machines due to their high sensitivity and stable chargeability as compared with usual organic elements, said multilayer type element comprising an electrically conductive substrate; a thin charge carrier generating layer formed on said substrate by depositing a charge carrier generating pigment capable of generating charge carriers on exposure to light in the proper way, for instance, such as vacuum vapor-deposition, coating a pigment solution or coating a dispersion of fine powdery pigment in a resin solution; and a charge transfer layer, formed thereon, in which the charge carriers generated by the charge carrier generating layer can be injected with efficiency and transferred, said charge transfer layer normally comprising a charge transfer substance and a binder resin. Some of these are put to practical use.

As the conventional multilayer type elements of this sort there are known (1) the multilayer type element using, as the charge carrier generating layer, a thin layer formed by vacuum-vapordepositing a perylene derivative and incorporating an oxadiazole derivative in the charge transfer layer (see U.S. Pat. No. 3,871,882), (2) the multilayer type element using, as the charge carrier generating layer, a thin layer formed by coating an organic amine solution of Chloro Dian Blue and incorporating a hydrazone compound in the charge transfer layer (see Japanese Patent Publication No. 42380/1980), (3) the multilayer type element using, as the charge carrier generating layer, a thin layer formed by coating an organic solvent dispersion of distyrylbenzene type disazo compound and incorporating a hydrazone compound in the charge transfer layer (see Japanese Laid Open Patent Application No. 84943/1980), and the like.

However, the fact is that even in the multilayer type elements of this sort the conventional ones have a number of advantages as well as various disadvantages.

The element using the perylene and oxadiazole derivatives disclosed in the preceding (1) involves the problems that the cost of production is raised because the charge carrier generating layer is formed by vacuum vapordeposition, and the sensitivity is insufficient to be used in the higher speed copying machines even if no problem is caused when used for practical purpose.

The element using the Chloro Dian Blue and hydrazone compound disclosed in the preceding (2) is superior in sensitivity but involves many disadvantages in the preparation because there is a necessity of using a hard-to-handle organic amine (for instance, ethylenediamine) as a coating solvent for the formation of the charge carrier generating layer. Further, this element is inferior in the reproductivity of red images from the original because its visible light wavelengths cover the range of about 450 to 660 nm. This necessitates employment a filter to cut a red light when actually setting this element in the copying machine, thereby exerting an unprofitable-influence upon the copying machine design.

The element using the distyrylbenzene type disazo compound and hydrazone compound disclosed in the preceding (3) is very profitable in the preparation because the charge carrier generating layer can be formed readily by coating a dispersion of disazo compound, but is defective, like the element disclosed in the preceding (2), in that the reproductivity of red images from the original is inferior because its visible light wavelengths cover the range of about 450 to 660 nm.

As the disazo compounds used in the multilayer type elements there are also known, for instance, the benzidine type disazo compound disclosed in Japanese Laid Open Patent Application Nos. 37543/1972 and 55643/1977, the stilbene type disazo compound disclosed in Japanese Laid Open Patent Application No. 8832/1977 and the like.

However, the multilayer type elements using these conventional disazo compounds are generally inferior in sensitivity and deteriorated in the reproductivity of red images from the original because its visible light wavelengths cover the range of about 450 to 700 nm. Accordingly, these elements exerted an unprofitable influence upon the copying machine design because the above disadvantages necessitate employment a filter to cut a red light when setting these elements in the copying machines.

SUMMARY OF THE INVENTION

It is an object of the present invention to provide a novel tetrazonium salt compound capable of obtaining a wide scope of disazo compounds that are used effectively in electrophotographic elements, in particular the above mentioned multilayer type elements.

It is another object of the present invention to provide a novel disazo compound used effectively in electrophotographic elements, in particular the above mentioned multilayer type elements.

It is a further object of the present invention to provide a method of making said disazo compound.

It is a further object of the present invention to develop a multilayer type element which can be produced readily, is high in sensitivity and whose sensible light wavelengths are localized in the short wavelength range, 450-600 nm, (in other words, which is superior in the reproductivity of red images from the original).

That is, the present invention is concerned with a novel tetrazonium salt compound having the following general formula (II):

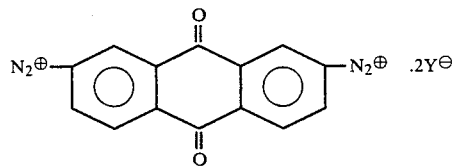

(wherein Y is an anion functional group.).

The tetrazonium salt compound having the general formula (II) is a useful intermediate of a disazo compound which, when combined with proper couplers, can synthesize a wide scope of disazo compounds having an anthraquinone skeleton and having an azo groups at 2- and 7-positions thereof. These disazo compounds are expected to be useful as photoconductive materials for electrophotographic elements, in particular charge carrier generating materials therefor.

As the typical examples of the anion functional group in the tetrazonium salt compound having the general formula (II) there are enumerated $Cl^\ominus$, $Br^\ominus$, $I^\ominus$, $BF_4^\ominus$, $PF_6^\ominus$,

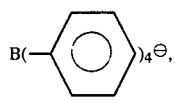

$ClO_4^\ominus$, $SO_4^{2\ominus}$,

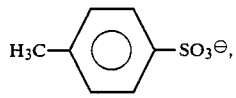

$AsF_6^\ominus$ and $SbF_6^\ominus$, preferably $BF_4^\ominus$.

The present invention also relates to a novel disazo compound having the general formula (I):

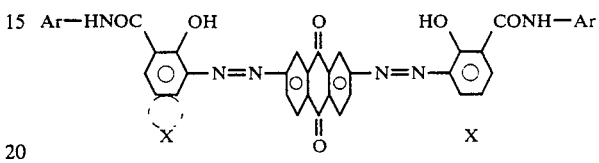

(wherein X represents a substituted or unsubstituted aromatic or hetero ring, and Ar represents a substituted or unsubstituted aromatic or hetero ring).

As the concrete examples of the aromatic ring represented by X in the general formula (I) there are enumerated a benzene ring, a naphthalene ring and the like. As the concrete examples of the hetero ring represented by X in the general formula (I) there are enumerated an indole ring, a carbazole ring, a benzofuran ring and the like. Further, as the concrete examples of the aromatic ring represented by Ar there are enumerated a benzene ring, a naphthalene ring and the like, and as the concrete examples of the hetero ring represented by Ar there are enumerated a dibenzofuran ring, a carbazole ring and the like.

As the concrete examples of substituents on the above mentioned rings there can be enumerated a lower alkyl group with 1-4 carbon atoms such as a methyl group, an alkoxy group with 1-4 carbon atoms such as a methoxy group, halogen such as fluorine, chlorine, bromine, iodine or the like, a trifluoromethyl group, a nitro group, a cyano group and the like.

In case X and Ar are benzene rings in the general formula (II), as the examples of further specified compounds there can be enumerated those having the following general formula (V):

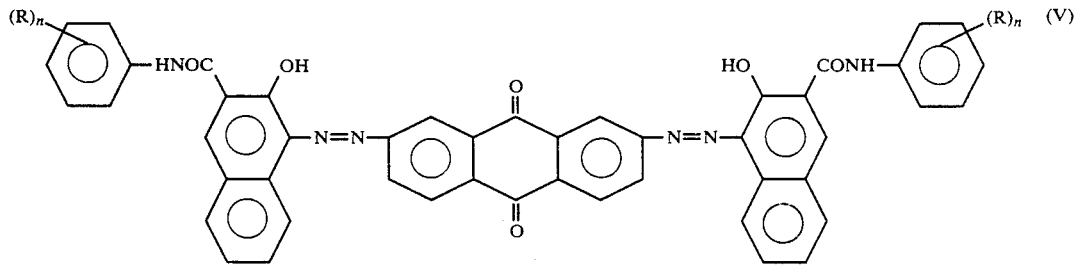

In this general formula, n is an integer of 0-4, and when n is 2 or more, R may be the same or different. As the concrete examples there can be enumerated a lower alkyl group such as a methyl group, an ethyl group or the like, a lower alkoxy group such as a methoxy group, an ethoxy group or the like, halogen such as fluorine, chlorine, bromine, iodine or the like, a triphenylmethyl group, a nitro group, a cyano group and the like.

The disazo compound having the general formula (I) of the present invention, as mentioned above, is useful as the charge carrier generating substance for use in the multilayer type electrophotographic element. Additionally, said compound is useful as the charge carrier generating substance for use in the electrophotographic element with a monolayer type photosensitive layer that is formed by dispersing the charge carrier generating substance and charge transfer substance in a resin and as the photoconductive substance for use in the electrophotographic element with a photosensitive layer that is formed by dispersing said photoconductive substance in a resin.

The present invention also relates to a method of making a disazo compound having the general formula (I):

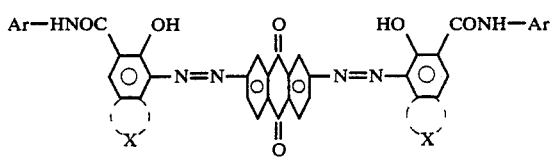

(wherein X represents a substituted or unsubstituted aromatic ring or hetero ring, and Ar represents a substituted or unsubstituted aromatic ring or hetero ring) which comprises diazotizing 2,7-diaminoanthraquinone having the formula (III):

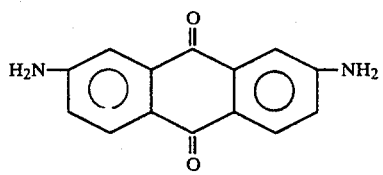

into tetrazonium salt having the general formula II:

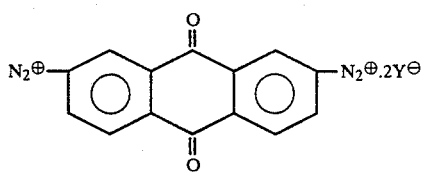

(wherein Y represents an anion functional group) and reacting this salt with a coupler having the general forumla (IV):

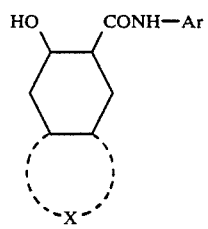

(wherein X and Ar are the same as defined above).

The concrete examples of X and Ar in the general formula (IV) are the same as those in the general formula (I).

In this method, diazotization of 2,7-diaminoanthraquinone is carried out by adding sodium nitrite thereto at a temperature of −10° C. to 20° C. in an inorganic acid, for instance, such as hydrochloric acid or sulfuric acid. This diazotization reaction completes in the time ranging from 30 minutes to 3 hours. The resulting reaction mixture is further added with for instance borofluoric acid or an aqueous sodium borofluoride solution to cause precipitation of tetrazonium salt. In this instance, it is preferable that precipitated crystals are filtrated therefrom and then employed in the next reaction step. Then, this tetrazonium salt is reacted with said coupler having the general formula (IV) to thereby cause a coupling reaction. Practically, this reaction is carried out by previously preparing a mixed solution of tetrazonium salt and coupler in an organic solvent such as N,N-dimethylformamide (DMF), dimethyl sulfoxide or the like and dropping an aqueous alkali solution, for instance, such as an aqueous sodium acetate solution in this mixed solution at a temperature of −10 ° C. to 40° C. This reaction completes in about 5 minutes to 3 hours. After completion of said reaction, separated crystals are removed by filtration and refined by a proper way (for instance, washing with water or/and organic solvent, recrystallization or the like). Thus, the preparation of said disazo compound is completed.

The diamino compound having the formula (III) can be synthesized according to, for intance, the method disclosed in "Industrial Chemical Magazine" 42 pages 895–903 (1939) edited by Ryohei Oda et al. and published by Nihon Chemical Associate.

The present invention further relates to a multilayer type electrophotographic element comprising forming, on an electrically conductive substrate, a charge carrier generating layer and a charge transfer layer, wherein said charge carrier generating layer contains a disazo compound having the general formula (I):

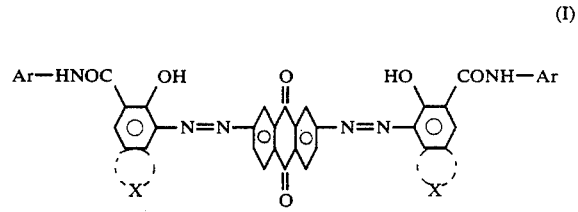

(wherein X represents a substituted or unsubstituted aromatic or hetero ring, and Ar represents a substituted or unsubstituted aromatic or hetero ring.) The concrete examples of the aromatic ring represented by X in the general formula (I) include a benzene ring, a naphthalene ring and the like. The concrete examples of the hetero ring include an indole ring, a carbazole ring, a benzofuran ring and the like. The concrete examples of the aromatic ring represented by Ar include a benzene ring, a naphthalene ring and the like.

As the substituents on the aromatic ring or hetero ring there are enumerated a lower alkyl group such as a methyl group, an ethyl group, a propyl group, a butyl group or the like, a lower alkoxy group such as a methoxy group, an ethoxy group, a propoxy group, a butoxy group or the like, a halogen atom such as fluorine, chlorine, bromine, iodine or the like, a lower alkylestercarboxyl group such as carboxyl group or its ethylester, a lower alkylamino group such as a dimethylamino group, a diethylamino group or the like, a cyano group, a nitro group, a sulfonic acid (—SO$_3$Na) group and the like.

The multilayer type element according to the present invention should be said to be a superior one for use in copying machines because it is produced readily, is high in sensitivity and further its visible light wavelengths are localized at the short wavelength region (450 to 600 nm).

Next, the concrete examples of the disazo compound according to the present invention will be shown in Table 1 and Table 2.

TABLE 1

| Compound No. | R$_1$ | R$_2$ | R$_3$ | R$_4$ |
|---|---|---|---|---|
| 1-1 | —OCH$_3$ | H | H | H |
| 1-2 | H | —OCH$_3$ | H | H |
| 1-3 | H | H | —OCH$_3$ | H |
| 1-4 | —OC$_2$H$_5$ | H | H | H |
| 1-5 | H | —OC$_2$H$_5$ | H | H |
| 1-6 | H | H | —OC$_2$H$_5$ | H |
| 1-7 | —CH$_3$ | H | H | H |
| 1-8 | H | —CH$_3$ | H | H |
| 1-9 | H | H | —CH$_3$ | H |
| 1-10 | —C$_2$H$_5$ | H | H | H |
| 1-11 | H | —C$_2$H$_5$ | H | H |
| 1-12 | H | H | —C$_2$H$_5$ | H |
| 1-13 | H | H | H | H |
| 1-14 | Cl | H | H | H |
| 1-15 | H | Cl | H | H |
| 1-16 | H | H | Cl | H |
| 1-17 | Br | H | H | H |
| 1-18 | H | Br | H | H |
| 1-19 | H | H | Br | H |
| 1-20 | I | H | H | H |
| 1-21 | H | I | H | H |
| 1-22 | H | H I | H | H |
| 1-23 | F | H | H | H |
| 1-24 | H | F | H | H |
| 1-25 | H | H | F | H |
| 1-26 | —CF$_3$ | H | H | H |
| 1-27 | H | —CF$_3$ | H | H |
| 1-28 | H | H | —CF$_3$ | H |
| 1-29 | —CN | H | H | H |
| 1-30 | H | —CN | H | H |
| 1-31 | H | H | —CN | H |
| 1-32 | —NO$_2$ | H | H | H |
| 1-33 | H | —NO$_2$ | H | H |
| 1-34 | H | H | —NO$_2$ | H |
| 1-35 | H | H | —COOH | H |
| 1-36 | H | H | —COOC$_2$H$_5$ | H |
| 1-37 | H | H | —N(CH$_3$)$_2$ | H |
| 1-38 | —OCH$_3$ | H | H | —OCH$_3$ |
| 1-39 | —OC$_2$H$_5$ | H | H | —OC$_2$H$_5$ |
| 1-40 | —CH$_3$ | H | H | —CH$_3$ |
| 1-41 | Cl | H | H | Cl |
| 1-42 | —CH$_3$ | H | H | Cl |
| 1-43 | —OCH$_3$ | H | —OCH$_3$ | H |
| 1-44 | —CH$_3$ | H | —CH$_3$ | H |
| 1-45 | —CH$_3$ | H | Cl | H |
| 1-46 | —NO$_2$ | H | —OCH$_3$ | H |
| 1-47 | H | —OCH$_3$ | H | —OCH$_3$ |
| 1-48 | —OCH$_3$ | H | H | Br |
| 1-49 | —CH$_3$ | H | —OCH$_3$ | H |
| 1-50 | —OCH$_3$ | H | Cl | —OCH$_3$ |
| 1-51 | —OCH$_3$ | H | —OCH$_3$ | Cl |
| 1-52 | H | H | —SO$_3$Na | H |
| 1-53 | H | H | —OC$_4$H$_9$(tert) | H |

TABLE-2

[Structure: A—N=N—(anthraquinone 2,6-positions)—N=N—A]

| Compound No. | A |
|---|---|
| 1-54 | 3-hydroxy-4-methyl-N-(1-naphthyl)-2-naphthamide |
| 1-55 | 3-hydroxy-4-methyl-N-(2-naphthyl)-2-naphthamide |
| 1-56 | 6-bromo-3-hydroxy-4-methyl-N-(2-methoxyphenyl)-2-naphthamide |
| 1-57 | 3-hydroxy-4-methyl-N-(2-methoxydibenzofuran-3-yl)-2-naphthamide |

TABLE-2-continued

[Structure: A—N=N—(anthraquinone 2,7-positions)—N=N—A]

| Compound No. | A |
|---|---|
| 1-58 | 3-hydroxy-4-methyl-N-(2-methylphenyl)-2-naphthamide |
| 1-59 | 3-hydroxy-4-methyl-N-(4-methoxy-2-methylphenyl)-(phenylamino-fused)-naphthamide |
| 1-60 | 3-hydroxy-4-methyl-N-(4-methoxyphenyl)-(phenylamino-fused)-naphthamide |

TABLE-2-continued

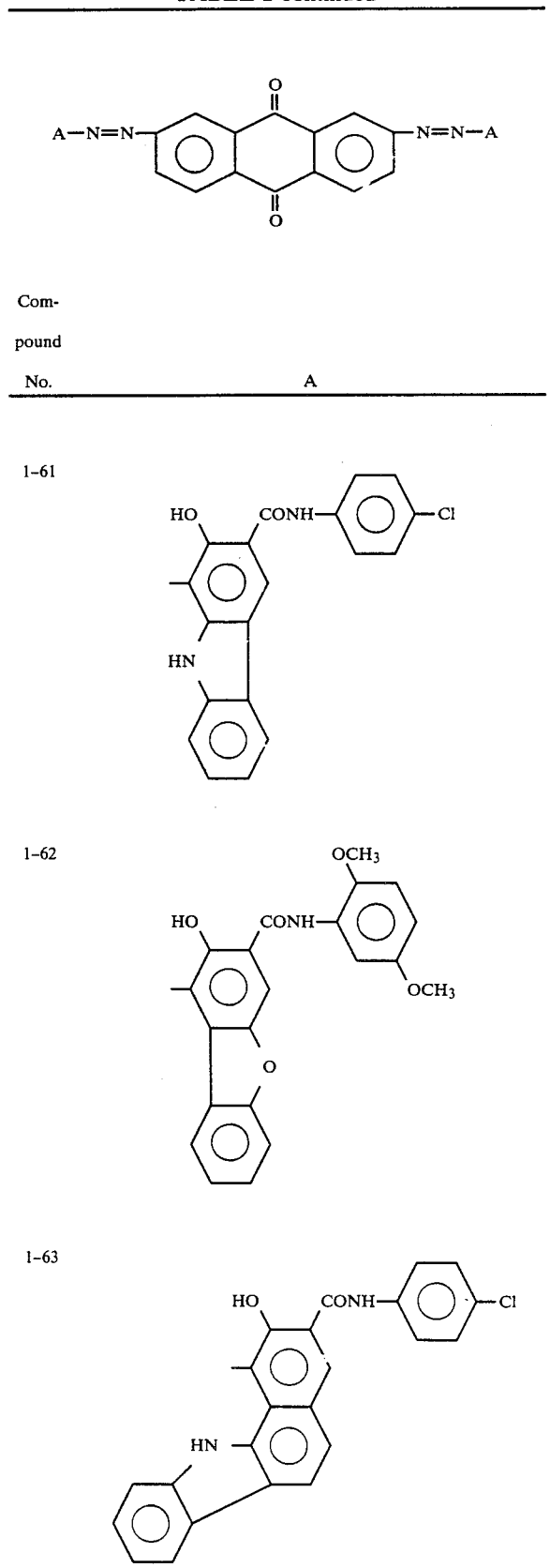

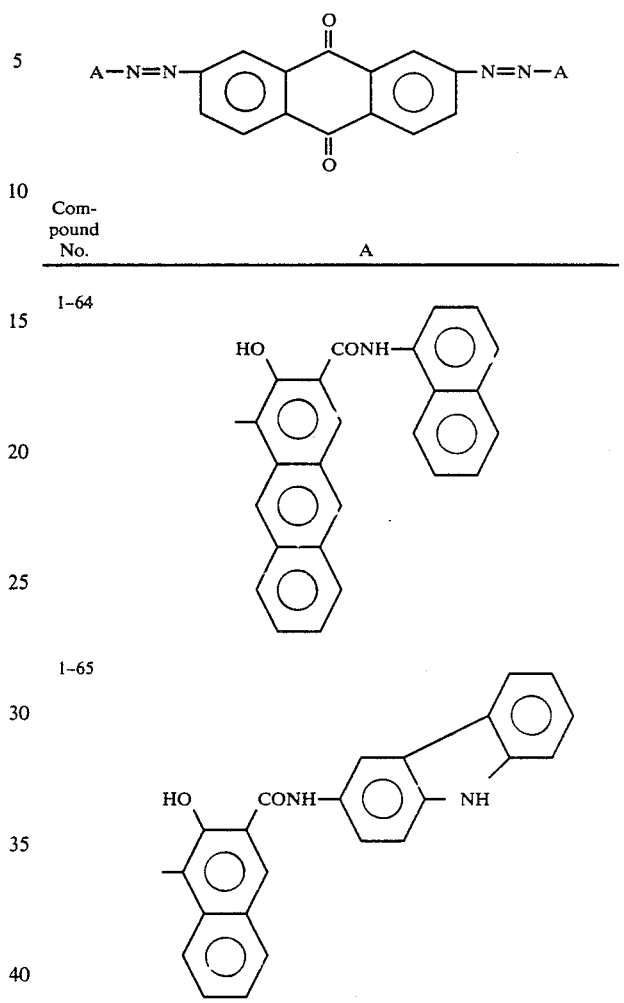

FIG. 1 is a grossly enlarged sectional view of an electrophotographic element embodying the present invention. This element is designed to form, on an electrically conductive substrate 11, a photosensitive layer 44 comprising a charge carrier generating layer 22 and a charge transfer layer 33.

As the electrically conductive layer suitably used in the present invention there can be enumerated metal plates, metal drums or metal foil of aluminum, nickel, chromium and the like, plastic films provided with thin layers of aluminum, tin oxide, indium oxide, chromium, palladium and the like, and electrically conductive substance-coated or impregnated paper or plastic films.

The charge carrier generating layer is formed on the electrically conductive substrate by coating the surface of the substrate with a dispersion obtained by dispersing, in a suitable solvent, very fine powders of the above specified disazo compound having the general formula (I) pulverized by means of a ball mill or the like and if needed, dissolving a binder resin therein. The thus formed charge carrier generating layer is surface-finished for instance by buffing or the like and the film thickness is regulated as occasion demands.

The thickness of this charge carrier generating layer 22 is 0.01 to 5 μm, preferably 0.05 to 2 μm. The percentage of disazo compound contained in the charge carrier generating layer is 10 to 100% by weight, preferably 30 to 95% by weight. If the film thickness of the charge carrier generating layer is less than 0.01 μm the sensitivity deteriorates, and if the film thickness is above 5 μm the potential retainability deteriorates. Further, if the percentage of disazo pigment contained in the charge carrier generating layer is less than 10% by weight the sensitivity deteriorates.

The charge transfer layer is formed by coating the surface of said charge carrier generating layer with a solution obtained by dissolving various charge transfer substances and binder resins referred to afterwards in a proper solvent for instance such as tetrahydrofuran or the like. The percentage of the charge transfer substance contained in the charge transfer layer is 10 to 80% by weight, preferably 25 to 75% by weight, and the film thickness of said layer is 2 to 100 μm, preferably 5 to 40 μm. If the percentage of the charge transfer substance contained in the charge transfer layer is less than 10% by weight the sensitivity deteriorates, while if said percentage is above 80% by weight there are brought about undesirable results such that the film becames brittle and the charge transfer layer becomes cloudy due to separated crystals. If the thickness of the charge transfer layer is less than 5 μm the potential retainability deteriorates and if said thickness is above 40 μm the residual potential rises.

The typical examples of the charge transfer substance used in the charge transfer layer will be shown below (1) a hydrazone compound having the general formula:

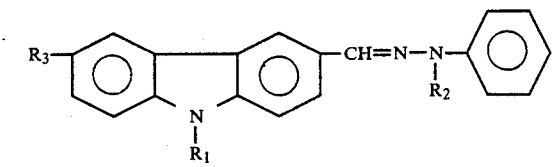

(wherein $R_1$ is methyl, ethyl, 2-hydroxyethyl or 2-chloroethyl, $R_2$ is methyl, ethyl, benzyl or phenyl, and $R_3$ is hydrogen, chlorine, bromine, $C_1$ to $C_4$ alkyl, $C_1$ to $C_4$ alkoxyl, dialkylamino or nitro.)

(2) a hydrazone compound having the general formula:

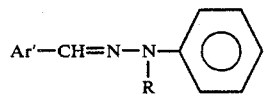

(wherein Ar' is a naphthalene ring, an anthracene ring, styryl and their substituents or a pyridine ring, a furan ring or a thiophene ring, and R is $C_1$ to $C_4$ alkyl or benzyl.)

(3) a hydrazone compound having the general formula:

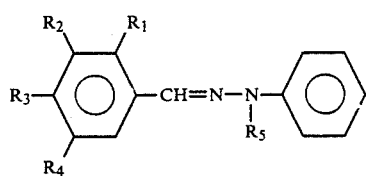

(wherein $R_1$, $R_2$, $R_3$ and $R_4$ each is hydrogen, $C_1$ to $C_3$ alkyl, $C_1$ to $C_3$ alkoxy, dialkylamino or benzylamino, and $R_5$ is alkyl or benzyl.)

(4) a hydrazone compound having the general formula:

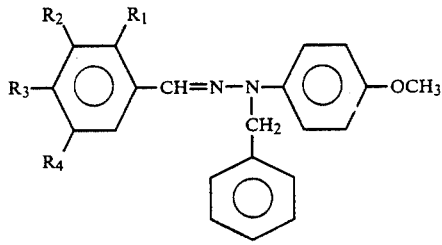

(wherein $R_1$, $R_2$, $R_3$ and $R_4$ each is hydrogen, $C_1$ to $C_3$ alkyl, $C_1$ to $C_3$ alkoxy, substituted or unsubstituted dialkylamino, dibenzylamino or halogen.)

(5) a diaryl methane compound having the general formula:

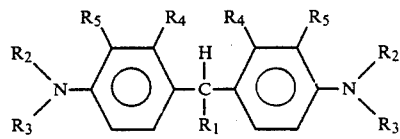

(wherein $R_1$ is $C_1$ to $C_{11}$ alkyl, substituted or unsubstituted phenyl or heterocyclic, $R_2$ and $R_3$, which may be same or different, each is hydrogen, $C_1$ to $C_4$ alkyl, hydroxyalkyl, chloroalkyl, substituted or unsubstituted aralkyl and $R_2$ and $R_3$ may be combined to form a nitrogen-containing heterocycle. $R_4$ and $R_5$, which may be same or different, each is hydrogen, $C_1$ to $C_4$ alkyl, $C_1$ to $C_4$ alkoxyl or halogen.)

(6) an anthracene compound having the general formula:

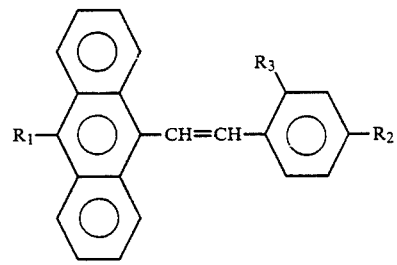

(wherein $R_1$ is hydrogen or halogen, $R_2$ is hydrogen, $C_1$ to $C_4$ alkyl, $C_1$ to $C_4$ alkoxyl, dialkylamino or substituted or unsubstituted diaralkylamino, and $R_3$ is hydrogen, $C_1$ to $C_4$ alkyl or halogen.)

(7) a fluorene compound having the general formula:

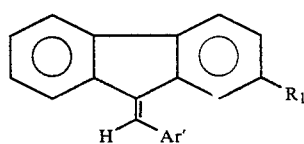

(wherein $R_1$ is hydrogen, halogen, cyano, $C_1$ to $C_4$ alkoxyl or $C_1$ to $C_4$ alkyl, and Ar' is

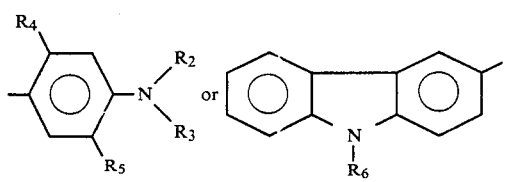

R$_2$, R$_3$ and R$_6$ each being hydrogen, C$_1$ to C$_4$ substituted or unsubstituted C$_1$ to C$_4$ alkyl or substituted or unsubstituted benzyl, R$_4$ and R$_5$ each being hydrogen, halogen, C$_1$ to C$_4$ alkyl, C$_1$ to C$_4$ alkoxyl or dialkylamino.)

(8) a divinylbenzene compound having the general formula:

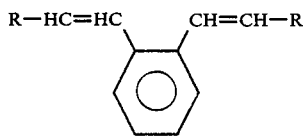

(wherein R is carbazolyl, pyridyl, thienyl, indolyl, furyl or substituted or unsubstituted phenyl, styryl, naphthyl or anthryl, these substituents being selected from the group consisting of dialkylamino, C$_1$ to C$_4$ alkyl, C$_1$ to C$_4$ alkoxyl, halogen, aralkylamino, N-alkyl-N-aralkylamino and amino.)

(9) a pyrazoline compound having the general formula:

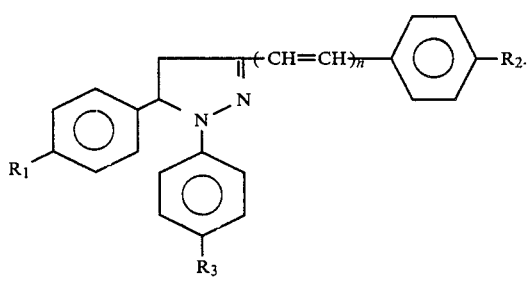

(wherein R$_1$, R$_2$ and R$_3$ each are hydrogen, C$_1$ to C$_4$ alkyl, C$_1$ to C$_4$ alkoxyl, dialkylamino or halogen, and n is an integer such as 0 or 1.)

Next, the concrete examples of the charge transfer substance used in the charge transfer layer will be shown below.

TABLE 3

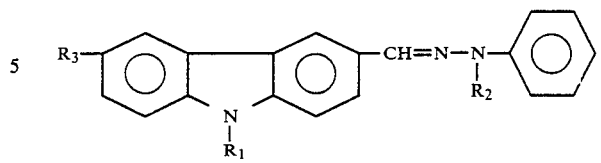

| Compound No. | R$_1$ | R$_2$ | R$_3$ |
|---|---|---|---|
| 2-1 | —CH$_3$ | —CH$_3$ | H |
| 2-2 | —CH$_3$ | —C$_2$H$_5$ | H |
| 2-3 | —CH$_3$ | —CH$_2$—⌬ | H |
| 2-4 | —CH$_3$ | —⌬ | H |
| 2-5 | —C$_2$H$_5$ | —CH$_3$ | H |
| 2-6 | —C$_2$H$_5$ | —C$_2$H$_5$ | H |
| 2-7 | —C$_2$H$_5$ | —CH$_2$—⌬ | H |
| 2-8 | —C$_2$H$_5$ | —⌬ | H |
| 2-9 | —C$_2$H$_4$OH | —CH$_3$ | H |
| 2-10 | —C$_2$H$_4$OH | —C$_2$H$_5$ | H |
| 2-11 | —C$_2$H$_4$OH | —CH$_2$—⌬ | H |
| 2-12 | —C$_2$H$_4$OH | —⌬ | H |
| 2-13 | —C$_2$H$_4$Cl | —CH$_3$ | H |
| 2-14 | —C$_2$H$_4$Cl | —C$_2$H$_5$ | H |
| 2-15 | —C$_2$H$_4$Cl | —CH$_2$—⌬ | H |
| 2-16 | —C$_2$H$_4$Cl | —⌬ | H |
| 2-17 | —CH$_3$ | —CH$_3$ | Cl |
| 2-18 | —CH$_3$ | —C$_2$H$_5$ | Br |
| 2-19 | —CH$_3$ | —C$_2$H$_5$ | —OCH$_3$ |
| 2-20 | —CH$_3$ | —C$_2$H$_5$ | —NO$_2$ |
| 2-21 | —CH$_3$ | —CH$_2$—⌬ | Cl |
| 2-22 | —CH$_3$ | —CH$_2$—⌬ | —N(CH$_3$)$_2$ |

TABLE 3-continued

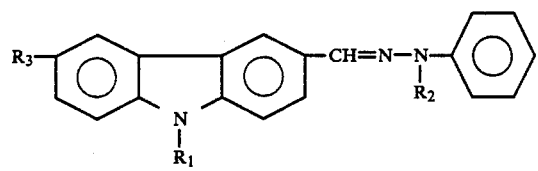

| Compound No. | $R_1$ | $R_2$ | $R_3$ |
|---|---|---|---|
| 2-23 | —CH$_3$ | —C$_6$H$_5$ | —N(C$_2$H$_5$)$_2$ |
| 2-24 | —C$_2$H$_5$ | —CH$_3$ | Cl |
| 2-25 | —C$_2$H$_5$ | —CH$_3$ | —OCH$_3$ |
| 2-26 | —C$_2$H$_5$ | —CH$_3$ | —NO$_2$ |
| 2-27 | —C$_2$H$_5$ | —CH$_2$C$_6$H$_5$ | Cl |
| 2-28 | —C$_2$H$_5$ | —CH$_2$C$_6$H$_5$ | —OC$_2$H$_5$ |
| 2-29 | —C$_2$H$_5$ | —CH$_2$C$_6$H$_5$ | —CH$_3$ |
| 2-30 | —C$_2$H$_5$ | —CH$_2$C$_6$H$_5$ | Br |
| 2-31 | —C$_2$H$_5$ | —CH$_2$C$_6$H$_5$ | —N(C$_2$H$_5$)$_2$ |
| 2-32 | —C$_2$H$_4$OH | —CH$_3$ | —OC$_2$H$_5$ |
| 2-33 | —C$_2$H$_4$OH | —CH$_3$ | —C$_2$H$_5$ |
| 2-34 | —C$_2$H$_4$OH | —CH$_3$ | —N(C$_2$H$_5$)$_2$ |
| 2-35 | —C$_2$H$_4$OH | —C$_2$H$_5$ | Br |
| 2-36 | —C$_2$H$_4$OH | —C$_2$H$_5$ | —NO$_2$ |
| 2-37 | —C$_2$H$_4$OH | —CH$_2$C$_6$H$_5$ | —C$_2$H$_5$ |
| 2-38 | —C$_2$H$_4$OH | —CH$_2$C$_6$H$_5$ | —OC$_2$H$_5$ |
| 2-39 | —C$_2$H$_4$OH | —CH$_2$C$_6$H$_5$ | —N(C$_2$H$_5$)$_2$ |

TABLE 3-continued

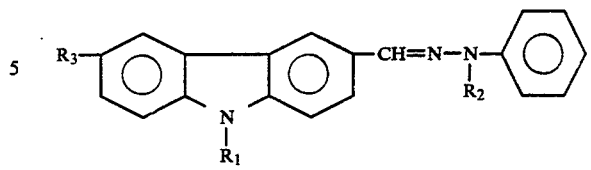

| Compound No. | $R_1$ | $R_2$ | $R_3$ |
|---|---|---|---|
| 2-40 | —C$_2$H$_4$OH | —C$_6$H$_5$ | —N(C$_2$H$_5$)$_2$ |
| 2-41 | —C$_2$H$_4$Cl | —CH$_3$ | Cl |
| 2-42 | —C$_2$H$_4$Cl | —C$_2$H$_5$ | Br |
| 2-43 | —C$_2$H$_4$Cl | —C$_2$H$_5$ | —NO$_2$ |
| 2-44 | —C$_2$H$_4$Cl | —CH$_2$C$_6$H$_5$ | —N(C$_2$H$_5$)$_2$ |
| 2-45 | —C$_2$H$_4$Cl | —C$_6$H$_5$ | —OCH$_3$ |
| 2-46 | —C$_2$H$_4$Cl | —C$_6$H$_5$ | —N(CH$_3$)$_2$ |

TABLE 4

Ar'—CH=N—N(R)(C$_6$H$_5$)

| Compound No. | Ar' | R |
|---|---|---|
| 2-47 | naphthyl | —CH$_3$ |
| 2-48 | naphthyl | —CH$_3$ |
| 2-49 | H$_3$CO-naphthyl | —CH$_3$ |

TABLE 4-continued

Ar'—CH=N—N(R)(C6H5)

| Compound No. | Ar' | R |
|---|---|---|
| 2-50 | 2-methoxynaphthalen-1-yl | —CH3 |
| 2-51 | anthracen-9-yl | —CH3 |
| 2-52 | C6H5—CH=CH— | —CH3 |
| 2-53 | 4-(CH3)2N—C6H4—CH=CH— | —CH3 |
| 2-54 | 2-methoxyphenyl-CH=CH— | —CH3 |
| 2-55 | C6H5—CH=C(CH3)— | —CH3 |
| 2-56 | naphthalen-1-yl | —CH2—C6H5 |
| 2-57 | naphthalen-2-yl | —CH2—C6H5 |
| 2-58 | 4-methoxynaphthalen-1-yl | —CH2—C6H5 |
| 2-59 | 2-methoxynaphthalen-1-yl | —CH2—C6H5 |
| 2-60 | anthracen-9-yl | —CH2—C6H5 |
| 2-61 | C6H5—CH=CH— | —CH2—C6H5 |
| 2-62 | 4-(CH3)2N—C6H4—CH=CH— | —CH2—C6H5 |
| 2-63 | 2-methoxyphenyl-CH=CH— | —CH2—C6H5 |
| 2-64 | C6H5—CH=C(CH3)— | —CH2—C6H5 |

TABLE 5

Structure: substituted benzaldehyde phenylhydrazone with R₁ (ortho), R₂ (meta), R₃ (para), R₄ (other meta) on the benzene ring, CH=N-N(R₅)(phenyl).

| Compound No. | $R_1$ | $R_2$ | $R_3$ | $R_4$ | $R_5$ |
|---|---|---|---|---|---|
| 2-65 | H | H | H | H | —CH₃ |
| 2-66 | H | H | —CH₃ | H | —CH₃ |
| 2-67 | H | H | —C₂H₅ | H | —CH₃ |
| 2-68 | —CH₃ | H | —CH₃ | H | —CH₃ |
| 2-69 | —CH₃ | H | H | —CH₃ | —CH₃ |
| 2-70 | H | H | —OCH₃ | H | —CH₃ |
| 2-71 | H | —OCH₃ | H | H | —CH₃ |
| 2-72 | —OCH₃ | H | H | H | —CH₃ |
| 2-73 | —OCH₃ | —OCH₃ | H | H | —CH₃ |
| 2-74 | —OCH₃ | H | —OCH₃ | H | —CH₃ |
| 2-75 | —OCH₃ | H | H | —OCH₃ | —CH₃ |
| 2-76 | H | —OCH₃ | —OCH₃ | H | —CH₃ |
| 2-77 | H | —OCH₃ | H | —OCH₃ | —CH₃ |
| 2-78 | —OCH₃ | —OCH₃ | —OCH₃ | H | —CH₃ |
| 2-79 | H | —OCH₃ | —OCH₃ | —OCH₃ | —CH₃ |
| 2-80 | H | H | —OC₂H₅ | H | —CH₃ |
| 2-81 | —OC₂H₅ | H | H | H | —CH₃ |
| 2-82 | H | —OC₂H₅ | —OC₂H₅ | H | —CH₃ |
| 2-83 | H | H | —N(CH₃)₂ | H | —CH₃ |
| 2-84 | H | H | —N(C₂H₅)₂ | H | —CH₃ |
| 2-85 | H | H | —N(CH₂C₆H₅)₂ | H | —CH₃ |
| 2-86 | H | H | H | H | —CH₂C₆H₅ |
| 2-87 | H | H | —CH₃ | H | —CH₂C₆H₅ |
| 2-88 | H | H | —C₂H₅ | H | —CH₂C₆H₅ |
| 2-89 | —CH₃ | H | —CH₃ | H | —CH₂C₆H₅ |
| 2-90 | —CH₃ | H | H | —CH₃ | —CH₂C₆H₅ |

TABLE 5-continued $$\underset{R_4}{\overset{R_2\ R_1}{\underset{R_3}{\bigodot}}}-CH=N-\underset{R_5}{N}-\bigodot$$

| Compound No. | R₁ | R₂ | R₃ | R₄ | R₅ |
|---|---|---|---|---|---|
| 2-91 | H | H | —OCH₃ | H | —CH₂—C₆H₅ |
| 2-92 | H | —OCH₃ | H | H | —CH₂—C₆H₅ |
| 2-93 | —OCH₃ | H | H | H | —CH₂—C₆H₅ |
| 2-94 | —OCH₃ | —OCH₃ | H | H | —CH₂—C₆H₅ |
| 2-95 | —OCH₃ | H | —OCH₃ | H | —CH₂—C₆H₅ |
| 2-96 | —OCH₃ | H | H | —OCH₃ | —CH₂—C₆H₅ |
| 2-97 | H | —OCH₃ | —OCH₃ | H | —CH₂—C₆H₅ |
| 2-98 | H | —OCH₃ | H | —OCH₃ | —CH₂—C₆H₅ |
| 2-99 | —OCH₃ | —OCH₃ | —OCH₃ | H | —CH₂—C₆H₅ |
| 2-100 | H | —OCH₃ | —OCH₃ | —OCH₃ | —CH₂—C₆H₅ |
| 2-101 | H | H | —OC₂H₅ | H | —CH₂—C₆H₅ |

TABLE 5-continued

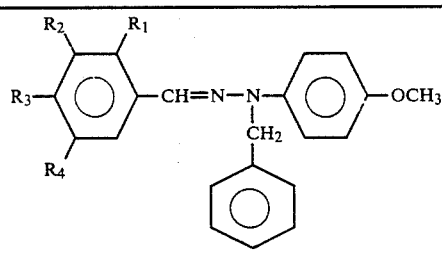

| Compound No. | $R_1$ | $R_2$ | $R_3$ | $R_4$ | $R_5$ |
|---|---|---|---|---|---|
| 2-102 | $-OC_2H_5$ | H | H | H | $-CH_2$-phenyl |
| 2-103 | H | $-OC_2H_5$ | $-OC_2H_5$ | H | $-CH_2$-phenyl |
| 2-104 | H | H | $-N(CH_3)_2$ | H | $-CH_2$-phenyl |
| 2-105 | H | H | $-N(C_2H_5)_2$ | H | $-CH_2$-phenyl |
| 2-106 | H | H | $-N(CH_2\text{-phenyl})_2$ | H | $-CH_2$-phenyl |

TABLE 6

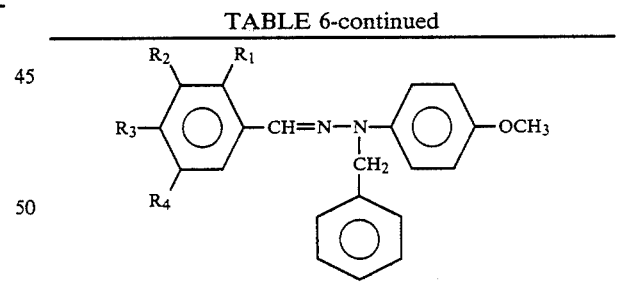

| Compound No. | $R_1$ | $R_2$ | $R_3$ | $R_4$ |
|---|---|---|---|---|
| 2-107 | H | H | H | H |
| 2-108 | H | H | $-CH_3$ | H |
| 2-109 | H | $-CH_3$ | H | H |
| 2-110 | $-CH_3$ | H | H | H |
| 2-111 | H | H | $-C_2H_5$ | H |
| 2-112 | $-CH_3$ | H | $-CH_3$ | H |
| 2-113 | $-CH_3$ | H | H | $-CH_3$ |
| 2-114 | H | H | $-OCH_3$ | H |
| 2-115 | H | $-OCH_3$ | H | H |
| 2-116 | $-OCH_3$ | H | H | H |
| 2-117 | $-OCH_3$ | $-OCH_3$ | H | H |
| 2-118 | $-OCH_3$ | H | $-OCH_3$ | H |
| 2-119 | $-OCH_3$ | H | H | $-OCH_3$ |
| 2-120 | H | $-OCH_3$ | $-OCH_3$ | H |
| 2-121 | H | $-OCH_3$ | H | $-OCH_3$ |
| 2-122 | $-OCH_3$ | $-OCH_3$ | $-OCH_3$ | H |
| 2-123 | H | $-OCH_3$ | $-OCH_3$ | $-OCH_3$ |
| 2-124 | H | H | $-OC_2H_5$ | H |
| 2-125 | $-OC_2H_5$ | H | H | H |
| 2-126 | H | $-OC_2H_5$ | $-OC_2H_5$ | H |
| 2-127 | H | H | $-N(CH_3)_2$ | H |
| 2-128 | H | H | $-N(C_2H_5)_2$ | H |

TABLE 6-continued

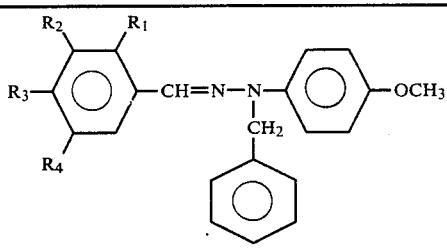

| Compound No. | $R_1$ | $R_2$ | $R_3$ | $R_4$ |
|---|---|---|---|---|
| 2-129 | —$CH_3$ | H | —N($C_2H_5$)($C_2H_5$) | H |
| 2-130 | Cl | H | —N($C_2H_5$)($C_2H_5$) | H |
| 2-131 | H | H | —N($C_2H_5$)($C_2H_4Cl$) | H |

TABLE 6-continued

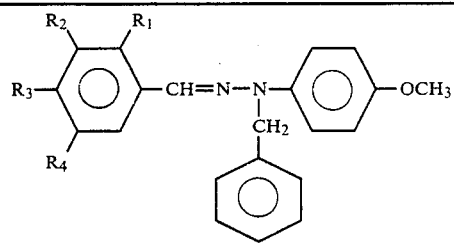

| Compound No. | $R_1$ | $R_2$ | $R_3$ | $R_4$ |
|---|---|---|---|---|
| 2-132 | H | H | Cl | H |
| 2-133 | H | Cl | H | H |
| 2-134 | Cl | H | H | H |
| 2-135 | H | H | Br | H |
| 2-136 | H | Br | H | H |
| 2-137 | Br | H | H | H |
| 2-138 | H | H | —$NO_2$ | H |
| 2-139 | H | —$NO_2$ | H | H |
| 2-140 | —$NO_2$ | H | H | H |
| 2-141 | H | H | —OH | H |
| 2-142 | H | —OH | H | H |
| 2-143 | —HO | H | H | H |

TABLE 7

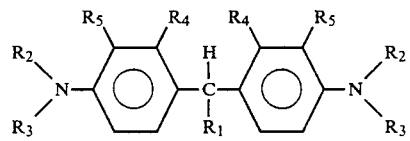

| Compound No. | $R_1$ | $R_2$ | $R_3$ | $R_4$ | $R_5$ |
|---|---|---|---|---|---|
| 2-144 | phenyl | —$C_2H_5$ | —$C_2H_5$ | H | H |
| 2-145 | phenyl | —$C_2H_5$ | —$C_2H_5$ | —$CH_3$ | H |
| 2-146 | phenyl | —$C_2H_5$ | —$C_2H_5$ | H | —$CH_3$ |
| 2-147 | phenyl | —$C_2H_5$ | —$C_2H_5$ | H | —$C_2H_5$ |
| 2-148 | phenyl | —n-$C_4H_9$ | —n-$C_4H_9$ | H | H |
| 2-149 | phenyl | —$C_2H_4Cl$ | —$C_2H_5$ | H | H |

TABLE 7-continued

Structure:
R5, R4 on each benzene ring; central CH-C(R1) linking two p-(NR2R3)-phenyl groups.

| Compound No. | R₁ | R₂ | R₃ | R₄ | R₅ |
|---|---|---|---|---|---|
| 2-150 | phenyl (–C₆H₅) | –C₂H₄OH | –C₂H₅ | H | H |
| 2-151 | phenyl | –CH₂(C₆H₅) | –CH₃ | H | H |
| 2-152 | 4-methylphenyl (p-tolyl) | –C₂H₅ | –C₂H₅ | H | H |
| 2-153 | p-tolyl | –C₂H₅ | –C₂H₅ | –CH₃ | H |
| 2-154 | p-tolyl | –C₂H₅ | –C₂H₅ | H | –CH₃ |
| 2-155 | p-tolyl | –C₂H₅ | –C₂H₅ | H | –C₂H₅ |
| 2-156 | p-tolyl | –n-C₄H₉ | –n-C₄H₉ | H | H |
| 2-157 | p-tolyl | –C₂H₄Cl | –C₂H₅ | H | H |
| 2-158 | p-tolyl | –C₂H₄OH | –C₂H₅ | H | H |
| 2-159 | p-tolyl | –CH₂(C₆H₅) | –CH₃ | H | H |
| 2-160 | 4-methoxyphenyl | –C₂H₅ | –C₂H₅ | H | H |
| 2-161 | 4-methoxyphenyl | –C₂H₅ | –C₂H₅ | –CH₃ | H |

TABLE 7-continued
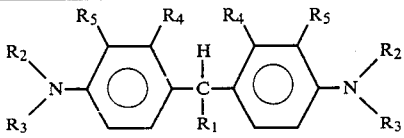
| Compound No. | R₁ | R₂ | R₃ | R₄ | R₅ |
|---|---|---|---|---|---|
| 2-162 | 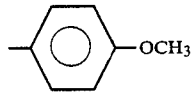 | —C₂H₅ | —C₂H₅ | H | —CH₃ |
| 2-163 | 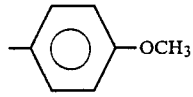 | —C₂H₅ | —C₂H₅ | H | —C₂H₅ |
| 2-164 | 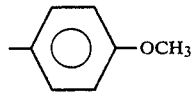 | —n-C₄H₉ | —n-C₄H₉ | H | H |
| 2-165 | 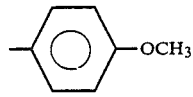 | —C₂H₄Cl | —C₂H₅ | H | H |
| 2-166 | 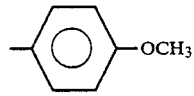 | —C₂H₄OH | —C₂H₅ | H | H |
| 2-167 | 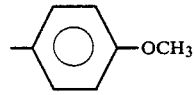 | —CH₂—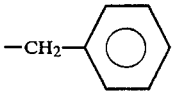 | —CH₃ | H | H |
| 2-168 | —CH₃ | —CH₂—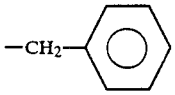 | —CH₂—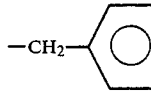 | H | H |
| 2-169 | —C₂H₅ | —CH₂—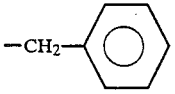 | —CH₂—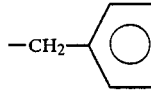 | H | H |
| 2-170 | —n-C₃H₇ | —CH₂—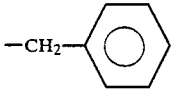 | —CH₂—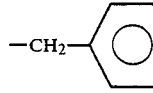 | H | H |
| 2-171 | 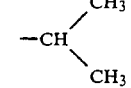 | —CH₂—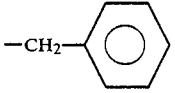 | —CH₂—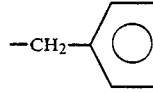 | H | H |
| 2-172 | —C₅H₁₁ | —CH₂—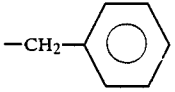 | —CH₂—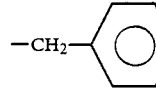 | H | H |
| 2-173 | 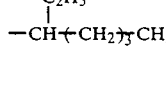 | —CH₂—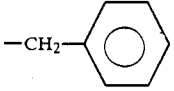 | —CH₂—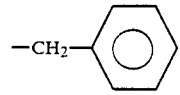 | H | H |

TABLE 7-continued $$R_2R_3N\text{-}C_6H_3(R_5)(R_4)\text{-}CH(R_1)\text{-}C_6H_3(R_4)(R_5)\text{-}NR_2R_3$$

| Compound No. | R₁ | R₂ | R₃ | R₄ | R₅ |
|---|---|---|---|---|---|
| 2-174 | —n-C₁₁H₂₅ | —CH₂—C₆H₅ | —CH₂—C₆H₅ | H | H |
| 2-175 | —CH₃ | —CH₂—C₆H₄—Cl | —CH₂—C₆H₄—Cl | H | H |
| 2-176 | —n-C₃H₇ | —CH₂—C₆H₄(Cl) (o-Cl) | —CH₂—C₆H₄(Cl) (o-Cl) | H | H |
| 2-177 | —n-C₃H₇ | —CH₂—C₆H₄—Br | —CH₂—C₆H₄—Br | H | H |
| 2-178 | —C₂H₅ | —CH₂—C₆H₄—CH₃ | —CH₂—C₆H₄—CH₃ | H | H |
| 2-179 | —CH(C₂H₅)(CH₂)₃CH₃ | —CH₂—C₆H₄—NO₂ | —CH₂—C₆H₄—NO₂ | H | H |
| 2-180 | 2-pyridyl | —C₂H₅ | —C₂H₅ | H | H |
| 2-181 | 2-pyridyl | —C₂H₅ | —C₂H₅ | —CH₃ | H |
| 2-182 | 3-pyridyl | —C₂H₅ | —C₂H₅ | H | H |
| 2-183 | 4-pyridyl | —C₂H₅ | —C₂H₅ | H | H |
| 2-184 | 2-furyl | —C₂H₅ | —C₂H₅ | H | H |
| 2-185 | 2-thienyl | —C₂H₅ | —C₂H₅ | H | H |

TABLE 7-continued

Structure: R_5, R_4 on one phenyl, R_4, R_5 on the other phenyl; central CH-R_1; N(R_2)(R_3) para on each ring.

| Compound No. | $R_1$ | $R_2$ | $R_3$ | $R_4$ | $R_5$ |
|---|---|---|---|---|---|
| 2-186 | 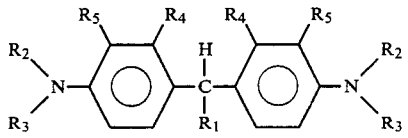 (3-indolyl, NH) | $-C_2H_5$ | $-C_2H_5$ | H | H |
| 2-187 | 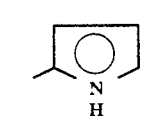 (pyrrolyl, NH) | $-C_2H_5$ | $-C_2H_5$ | H | H |
| 2-188 | 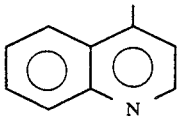 (4-quinolyl) | $-C_2H_5$ | $-C_2H_5$ | H | H |
| 2-189 | 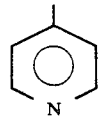 (4-pyridyl) | $-C_2H_5$ | $-C_2H_5$ | $-CH_3$ | H |
| 2-190 |  (furyl) | $-C_2H_5$ | $-C_2H_5$ | $-CH_3$ | H |
| 2-191 |  (thienyl) | $-C_2H_5$ | $-C_2H_5$ | $-CH_3$ | H |
| 2-192 |  (3-pyridyl) | $-C_2H_5$ | $-C_2H_5$ | H | $-C_2H_5$ |
| 2-193 |  (furyl) | $-C_2H_5$ | $-C_2H_5$ | H | $-CH_3$ |
| 2-194 |  (2-pyridyl) | $-CH_3$ | $-CH_3$ | H | $-C_2H_5$ |
| 2-195 | 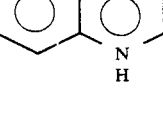 (3-indolyl, NH) | $-CH_3$ | $-CH_3$ | H | $-C_2H_5$ |
| 2-196 |  (3-pyridyl) | $-n-C_4H_9$ | $-n-C_4H_9$ | H | H |

TABLE 7-continued
| Compound No. | R₁ | R₂ | R₃ | R₄ | R₅ |
|---|---|---|---|---|---|
| 2-197 | 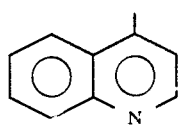 | —n-C₄H₉ | —n-C₄H₉ | H | H |
| 2-198 |  | —C₂H₄Cl | —C₂H₅ | H | H |
| 2-199 | 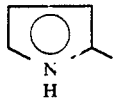 | —C₂H₄Cl | —C₂H₅ | H | H |
| 2-200 | 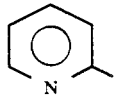 | —C₂H₄OH | —C₂H₅ | H | H |
| 2-201 | 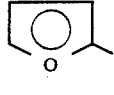 | —C₂H₄OH | —C₂H₅ | H | H |
| 2-202 | 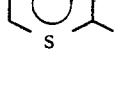 | —CH₂—⌬ | —CH₃ | H | H |
| 2-203 | 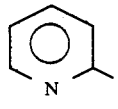 | —CH₂—⌬ | —CH₃ | H | H |
| 2-204 | 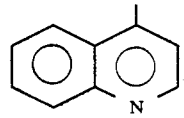 | | 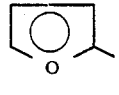 | H | H |
| 2-205 | 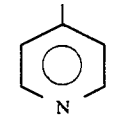 | | 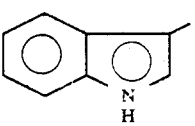 | H | H |
| 2-206 | 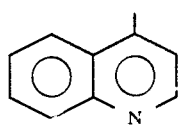 | —CH₃ | —CH₃ | —OCH₃ | H |
| 2-207 | 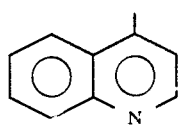 | —CH₃ | —CH₃ | —OCH₃ | H |

TABLE 7-continued
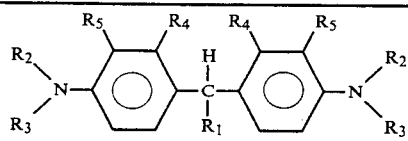
| Compound No. | R₁ | R₂ | R₃ | R₄ | R₅ |
|---|---|---|---|---|---|
| 2-208 | (2-methylpyrrole) | —CH₃ | —CH₃ | —OCH₃ | H |
| 2-209 | (2-methylpyridine) | —CH₃ | —CH₃ | Cl | H |
| 2-210 | (2-methylthiophene) | —CH₃ | —CH₃ | H | Cl |
| 2-211 | (1-ethyl-2-phenylindol-3-yl) | —C₂H₅ | —C₂H₅ | —CH₃ | H |
| 2-212 | (9-ethylcarbazol-3-yl) | —C₂H₅ | —C₂H₅ | —CH₃ | H |
TABLE 8
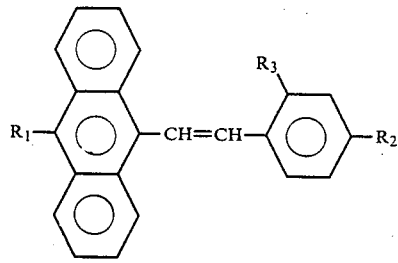
| Compound No. | R₁ | R₂ | R₃ |
|---|---|---|---|
| 2-213 | H | —N(C₂H₅)₂ | H |
| 2-214 | Br | —OCH₃ | H |
| 2-215 | Br | —N(C₂H₅)₂ | H |
| 2-216 | H | —N(n-C₄H₉)₂ | H |
TABLE 8-continued
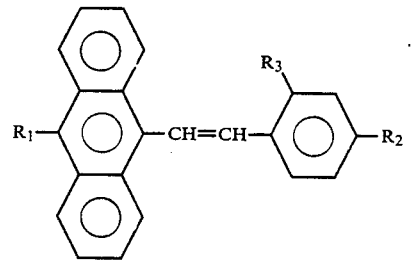
| Compound No. | R₁ | R₂ | R₃ |
|---|---|---|---|
| 2-217 | H | H | H |
| 2-218 | H | —NO₂ | H |
| 2-219 | H | —CH₃ | H |
| 2-220 | H | —CN | H |
| 2-221 | H | —N(CH₃)₂ | H |
| 2-222 | H | Cl | H |

TABLE 8-continued
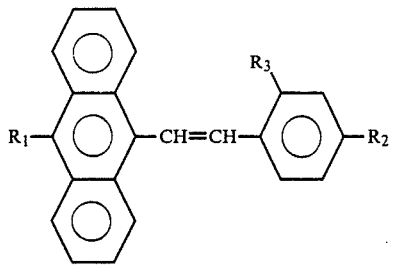
| Compound No. | R₁ | R₂ | R₃ |
|---|---|---|---|
| 2-223 | H | —CH=CH—(anthracenyl) | H |
| 2-224 | H | —N(CH₃)₂ | —CH₃ |
| 2-225 | H | —N(CH₂Ph)₂ | H |
| 2-226 | H | —N(CH₃)₂ | Cl |
| 2-227 | H | —N(CH₂-(3-Cl-C₆H₄))₂ | H |
TABLE 9
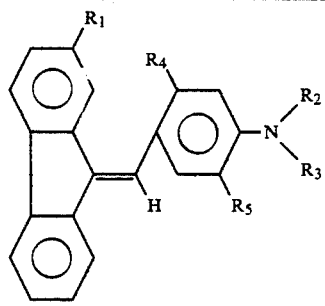
| Compound No. | R₁ | R₂ | R₃ | R₄ | R₅ |
|---|---|---|---|---|---|
| 2-228 | H | —CH₂—C₆H₅ | H | H | H |
| 2-229 | H | —CH₂—C₆H₄—CH₃ | H | H | H |
| 2-230 | —OCH₃ | —C₂H₅ | —CH₂—C₆H₄—CH₃ | H | H |
| 2-231 | —OCH₃ | —C₂H₅ | —CH₂—C₆H₅ | —OCH₃ | H |

TABLE 9-continued
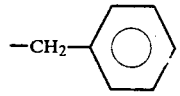
| Compound No. | R₁ | R₂ | R₃ | R₄ | R₅ |
|---|---|---|---|---|---|
| 2-232 | H | —n-C₃H₇ | —CH₂—C₆H₅ | —OCH₃ | H |
| 2-233 | H | —C₂H₅ | —CH₂—C₆H₅ | H | H |
| 2-234 | Br | —CH₃ | —CH₂—C₆H₃(CH₃)₂ (2,4-dimethyl) | H | H |
| 2-235 | H | —CH₃ | —CH₂—C₆H₅ | H | —CH₃ |
| 2-236 | H | —CH₃ | —CH₂—C₆H₅ | Cl | H |
| 2-237 | H | —C₂H₄Cl | —CH₂—C₆H₄—Cl | H | H |
| 2-238 | H | —C₂H₄Cl | —CH₂—C₆H₅ | H | H |
| 2-239 | H | —C₂H₄Cl | —CH₂—C₆H₅ | H | H |
| 2-240 | —CN | —C₂H₄OH | —CH₂—C₆H₄—CH₃ | H | H |
| 2-241 | —CH₃ | —CH₂—C₆H₅ | —CH₂—C₆H₅ | H | H |

TABLE 9-continued

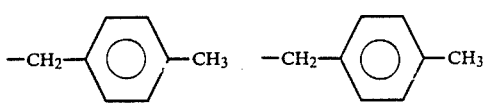

| Compound No. | $R_1$ | $R_2$ | $R_3$ | $R_4$ | $R_5$ |
|---|---|---|---|---|---|
| 2-242 | —CH$_3$ | —CH$_2$—C$_6$H$_4$—CH$_3$ | —CH$_2$—C$_6$H$_4$—CH$_3$ | H | H |
| 2-243 | H | —CH$_2$—C$_6$H$_5$ | —CH$_2$—C$_6$H$_5$ | —OCH$_3$ | H |
| 2-244 | —CN | —CH$_2$—C$_6$H$_5$ | —CH$_2$—C$_6$H$_5$ | —OCH$_3$ | H |
| 2-245 | H | —CH$_2$—C$_6$H$_4$—CH$_3$ | —CH$_2$—C$_6$H$_4$—CH$_3$ | H | —CH$_3$ |
| 2-246 | H | —CH$_2$—C$_6$H$_5$ | —CH$_2$—C$_6$H$_5$ | —N(C$_2$H$_5$)$_2$ | H |
| 2-247 | H | —CH$_2$—C$_6$H$_5$ | —CH$_2$—C$_6$H$_5$ | —CH$_3$ | —CH$_3$ |
| 2-248 | Br | —CH$_2$—C$_6$H$_5$ | —CH$_2$—C$_6$H$_5$ | —C$_2$H$_5$ | H |
| 2-249 | H | —CH$_2$—C$_6$H$_4$—OCH$_3$ | —CH$_2$—C$_6$H$_4$—OCH$_3$ | Cl | H |
| 2-250 | H | —CH$_2$—C$_6$H$_5$ | —CH$_2$—C$_6$H$_5$ | Cl | —OCH$_3$ |
| 2-251 | H | —CH$_2$—C$_6$H$_4$—NO$_2$ | —CH$_2$—C$_6$H$_4$—NO$_2$ | H | H |
| 2-252 | —OCH$_3$ | —CH$_2$—C$_6$H$_4$—Cl | —CH$_2$—C$_6$H$_4$—Cl | H | H |

TABLE 9-continued

[Structure: fluorene with =CH- linker to phenyl bearing R4 (ortho to N), NR2R3, and R5 (ortho to N); R1 on fluorene]

| Compound No. | R1 | R2 | R3 | R4 | R5 |
|---|---|---|---|---|---|
| 2-253 | H | —CH2—(3-Cl-C6H4) | —CH2—(3-Cl-C6H4) | H | H |
| 2-254 | H | —CH2—(2-Cl-C6H4) | —CH2—(2-Cl-C6H4) | H | H |
| 2-255 | Br | —CH2—(4-OCH3-C6H4) | —CH2—(4-OCH3-C6H4) | H | H |
| 2-256 | H | —CH2—(2-OCH3-C6H4) | —CH2—(2-OCH3-C6H4) | H | H |
| 2-257 | H | —CH2—C6H5 | —CH2—C6H5 | —N(CH3)2 | H |
| 2-258 | H | —CH2—(4-CH3-C6H4) | —CH2—(4-CH3-C6H4) | Cl | —OCH3 |
| 2-259 | H | —CH2—(2,4-(CH3)2-C6H3) | —CH2—(2,4-(CH3)2-C6H3) | H | H |
| 2-260 | H | —CH2—(2,5-(CH3)2-C6H3) | —CH2—(2,5-(CH3)2-C6H3) | H | H |

TABLE 9-continued

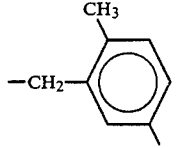

| Compound No. | $R_1$ | $R_2$ | $R_3$ | $R_4$ | $R_5$ |
|---|---|---|---|---|---|
| 2-261 | H | -CH₂-(2,5-dimethylphenyl) | -CH₂-(2,5-dimethylphenyl) | —OCH₃ | H |
| 2-262 | H | -CH₂-(2-chloro-5-methoxyphenyl) | -CH₂-(2-chloro-5-methoxyphenyl) | —OCH₃ | H |
| 2-263 | H | -CH₂-(2-nitrophenyl) | -CH₂-(2-nitrophenyl) | H | H |
| 2-264 | H | -CH₂-(4-methylphenyl) | -CH₂-(4-methylphenyl) | -N(CH₃)₂ | H |
| 2-265 | H | -CH₂-C₆H₅ | -CH₂-C₆H₅ | H | H |
| 2-266 | H | -CH₂-(4-methylphenyl) | -CH₂-(4-methylphenyl) | H | H |
| 2-267 | —C₂H₅ | -CH₂-(4-nitrophenyl) | -CH₂-(4-nitrophenyl) | H | H |
| 2-268 | H | -CH₂-(4-chlorophenyl) | -CH₂-(4-chlorophenyl) | H | H |
| 2-269 | H | -CH₂-(4-methoxyphenyl) | -CH₂-(4-methoxyphenyl) | H | H |

TABLE 10

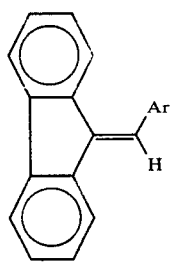

| Compound No. | Ar |
|---|---|
| 2-270 | 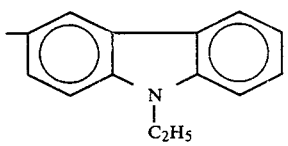 |

TABLE 11

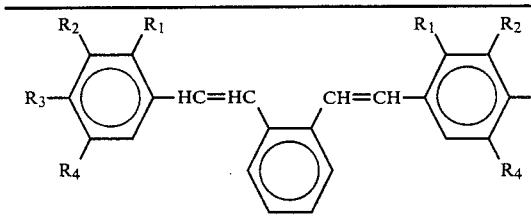

| Compound No. | $R_1$ | $R_2$ | $R_3$ | $R_4$ |
|---|---|---|---|---|
| 2-271 | H | H | Cl | H |
| 2-272 | H | H | $-N\begin{matrix}C_2H_5\\C_2H_5\end{matrix}$ | H |
| 2-273 | $-CH_3$ | H | $-N\begin{matrix}C_2H_5\\C_2H_5\end{matrix}$ | H |
| 2-274 | H | H | $-N\begin{matrix}n\text{-}C_4H_9\\n\text{-}C_4H_9\end{matrix}$ | H |
| 2-275 | Cl | H | $-N\begin{matrix}CH_3\\CH_3\end{matrix}$ | H |
| 2-276 | H | H | $-CN$ | H |
| 2-277 | H | H | 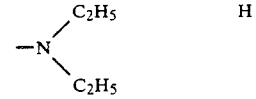 | H |
| 2-278 | H | H | $-CH_3$ | H |
| 2-279 | $-CH_3$ | H | H | H |
| 2-280 | H | H | $-NO_2$ | H |
| 2-281 | H | $-NO_2$ | H | H |
| 2-282 | $-NO_2$ | H | H | H |
| 2-283 | H | H | $-OC_2H_5$ | H |

TABLE 11-continued

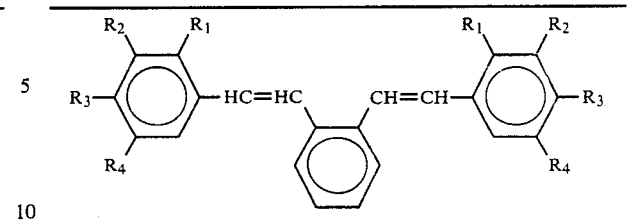

| Compound No. | $R_1$ | $R_2$ | $R_3$ | $R_4$ |
|---|---|---|---|---|
| 2-284 | H | H | Br | H |
| 2-285 | H | Br | H | H |
| 2-286 | H | H | $-NHCOCH_3$ | H |
| 2-287 | $-NH_2$ | H | H | H |
| 2-288 | H | H | $-NH_2$ | H |
| 2-289 | H | $-NH_2$ | H | H |
| 2-290 | H | H | $-C_2H_5$ | H |
| 2-291 | $-OCH_3$ | H | H | H |
| 2-292 | $-OCH_3$ | H | $-N\begin{matrix}C_2H_5\\C_2H_5\end{matrix}$ | H |
| 2-293 | H | H | $-COOC_2H_5$ | H |
| 2-294 | H | H | $-COOH$ | H |
| 2-295 | H | H | 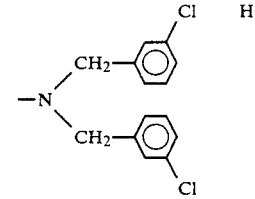 | H |
| 2-296 | H | H | 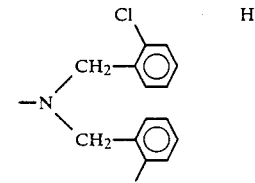 | H |
| 2-297 | H | H | 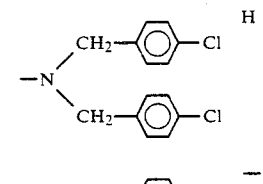 | H |
| 2-298 | H | H | 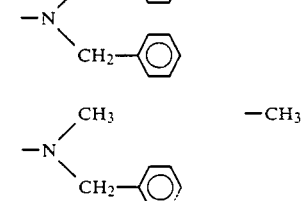 | H |
| 2-299 | Cl | H |  | $-OCH_3$ |
| 2-300 | Cl | H | $-N\begin{matrix}CH_3\\CH_2\text{-}\phi\end{matrix}$ | $-CH_3$ |

TABLE 11-continued
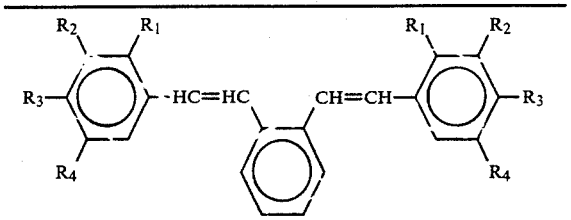
| Compound No. | R₁ | R₂ | R₃ | R₄ |
|---|---|---|---|---|
| 2-301 | H | H | H | H |
| 2-302 | H | —OCH₃ | H | —OCH₃ |
| 2-303 | —OCH₃ | —OCH₃ | —OCH₃ | H |
| 2-304 | —OCH₃ | H | H | —OCH₃ |
| 2-305 | H | H | —OH | H |
| 2-306 | H | H | —N(CH₂-C₆H₄-OCH₃)₂ | H |
| 2-307 | H | —CH₃ | —N(CH₂-C₆H₅)₂ | H |
| 2-308 | H | H | —N(CH₃)₂ | H |
TABLE 12
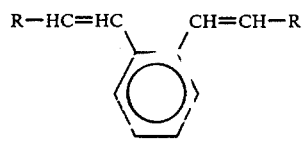
| Compound No. | R |
|---|---|
| 2-309 | —CH=CH—C₆H₄—OCH₃ |
| 2-310 | 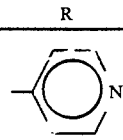 (9-ethylcarbazol-3-yl) |
| 2-311 | thiophene |
| 2-312 | furan |
| 2-313 | 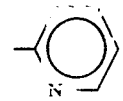 (pyridyl) |
| 2-314 | 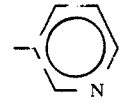 (pyridyl) |
| 2-315 | 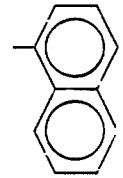 (pyridyl) |
| 2-316 | 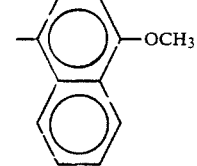 (naphthyl) |
| 2-317 | 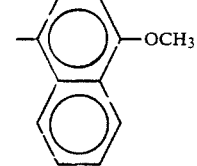 methoxynaphthyl (—OCH₃) |
| 2-318 | 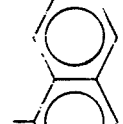 (anthryl) |
| 2-319 | —CH=CH—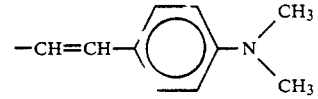—N(CH₃)₂ |
| 2-320 | —CH=CH—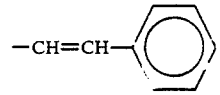 |
| 2-321 | —CH=CH——N(C₂H₅)₂ |

TABLE 13

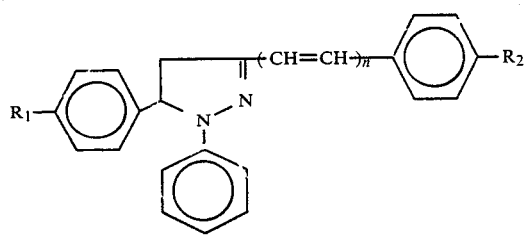

| Compound No. | n | $R_1$ | $R_2$ |
| --- | --- | --- | --- |
| 2-322 | 0 | $-N\begin{smallmatrix}C_2H_5\\C_2H_5\end{smallmatrix}$ | H |
| 2-323 | 0 | $-N\begin{smallmatrix}CH_3\\CH_3\end{smallmatrix}$ | H |
| 2-324 | 0 | $-OCH_3$ | H |
| 2-325 | 0 | $-OC_2H_5$ | H |
| 2-326 | 0 | $-CH_3$ | H |
| 2-327 | 1 | $-N\begin{smallmatrix}C_2H_5\\C_2H_5\end{smallmatrix}$ | $-N\begin{smallmatrix}C_2H_5\\C_2H_5\end{smallmatrix}$ |
| 2-328 | 1 | $-OC_2H_5$ | $-OC_2H_5$ |
| 2-329 | 1 | $-OCH_3$ | $-OCH_3$ |
| 2-330 | 1 | $-CH_3$ | $-CH_3$ |
| 2-331 | 1 | $-N\begin{smallmatrix}CH_3\\CH_3\end{smallmatrix}$ | $-N\begin{smallmatrix}CH_3\\CH_3\end{smallmatrix}$ |

In addition to the above enumerated compounds, there can be effectively employed any one of the following known charge transfer substances including the high molecular substances such as poly-N-vinylcarbazole, halogenated-poly-N-vinylcarbazole, polyvinylpyrene or condensation resins such as bromopyrene-formaldehyde condensation resin, N-ethylcarbazole-formaldehyde condensation resin and the like, and the low molecular substances such as oxazole derivatives, oxadiazole derivatives, nitro derivatives of fluorenone and the like.

The binder resins used for the charge carrier generating layer herein include polyester resin, butyral resin, ethyl cellulose resin, epoxy resin, acryl resin, vinylidene chloride resin, polystyrene, polybutadiene and their copolymers. They may be used singly or in the mixed state of two kinds or more.

The binder resins for use in the charge transfer layer include polycarbonate resin, polyester resin, polystyrene, polyurethane resin, epoxy resin, acryl resin, silicone resin and their copolymers. They may be used singly or in the mixed state of two kinds or more.

Further, various additives may be incorporated in the charge transfer layer for the purpose of improving its flexibility or durability. As the additives used for this purpose there can be enumerated halogenated paraffin, dialkyl phthalate, silicone oil and the like. In the case of the element according to the present invention, it is also possible to provide a barrier layer between the electrically conductive substrate and the charge carrier generating layer, an intermediate layer between the charge carrier generating layer and the charge transfer layer, and an overcoat layer on the charge transfer layer as occasion demands.

Still further, the disazo compounds having the general formula (I) of the present invention may be dispersed, taking the powdery form, in the binder resin (which, if needed, may contain the charge transfer substance). That is, said disazo compounds may also be used in a dispersion type element.

The electrophotographic element of the present invention is constructed as mentioned above. Accordingly, as will be evident from examples and comparative examples referred to afterwards, the electrophotographic element of the present invention may be said to have superior properties that it is produced easily as compared with the conventional multilayer type elements, it is high in sensitivity because its visible light wavelengths are localized at the short wavelength region (about 450 to 600 nm), and it is stable in characteristics even when used repeatedly,

PREFERRED EMBODIMENTS OF THE INVENTION

Next, the present invention will be explained substantially with reference to examples. However, it is to be understood that the embodiments of the present invention should not be limited thereto.

First, the preparation examples of the tetrazonium salt and the disazo compound according to the present invention will be given as follows.

PREPARATION EXAMPLE 4.76 gr of 2,7-diaminoanthraquinone was dissolved in 40 ml of a concentrated sulfuric acid while cooling with ice. This solution was poured into 100 ml of cold water. Further, a solution obtained by dissolving 3.0 gr of sodium nitrite in 10 ml of water was dropped in this mixture at 0°–5° C. for about 20 minutes. This reaction mixture was stirred at about 0° C. for additional 40 minutes. Thereafter, same was poured in 400 ml of cold water. Then, a small amount of insoluble matter was filtrated therefrom. Thereafter, 50 ml of 42% $HBF_4$ was added to the filtrate. The separated precipitates were filtered out, washed with 100 ml of cold water, further washed with 100 ml of methanol and dried to thereby obtain 7.16 g (Yield: 82.1%) of light-brown anthraquinone-2,7-bisdiazoniumbistetrafluoroborate.

Infrared absorption spectrum (KBr tablet method)

| | |
| --- | --- |
| $\nu N_2^{\oplus}$ | 2280 cm$^{-1}$ |

-continued

| | |
|---|---|
| νCo | 1680 cm$^{-1}$ |

| Elementary analysis value as $C_{14}H_6N_4O_2B_2F_8$ | |
|---|---|
| Actual value | Calculated value |
| N % 13.03 | 13.22 |

Figure 3:
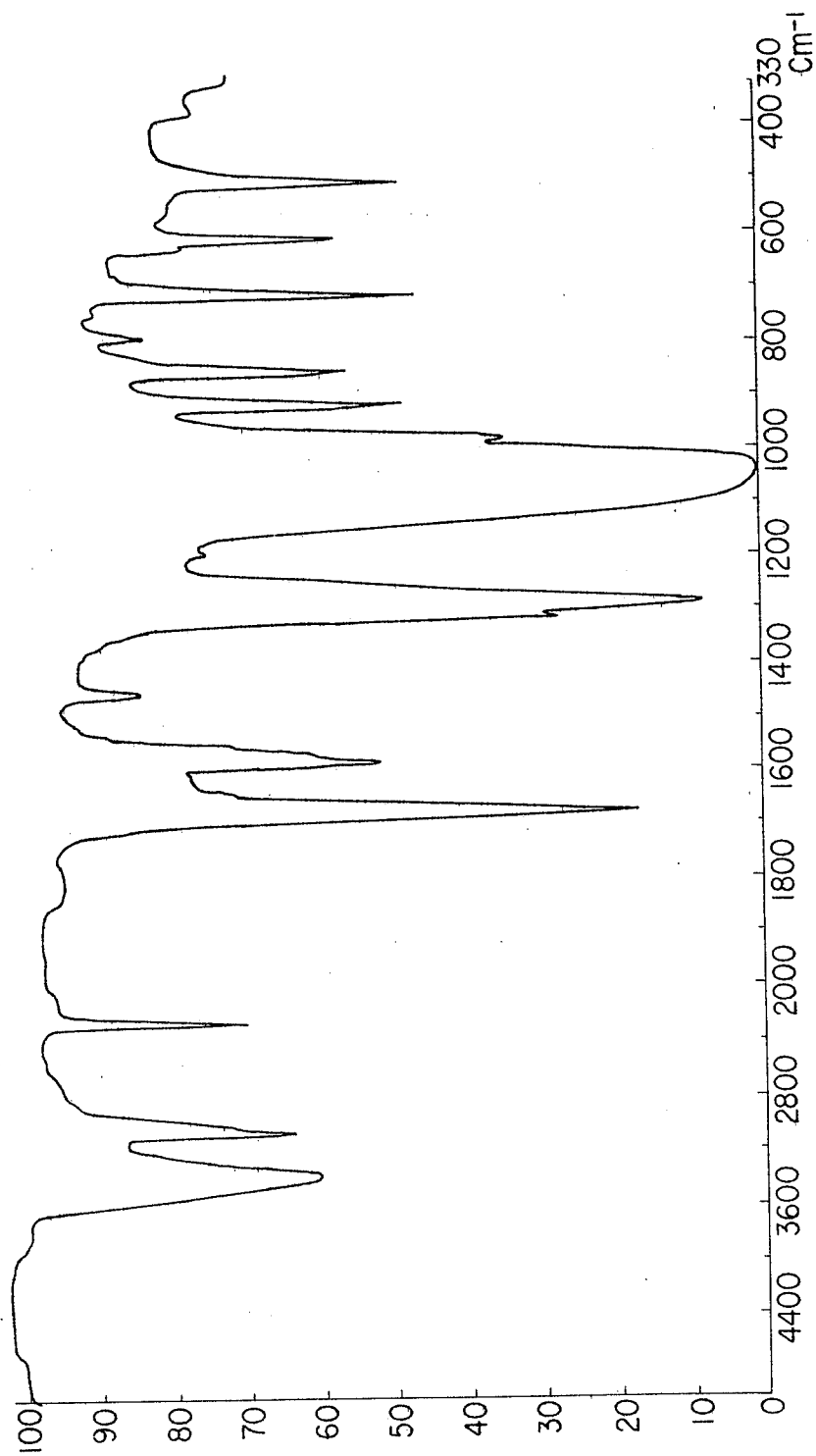
FIG. 3 is a view illustrating infrared absorption spectrum (KBr tablet method) of the tetrazonium salt compound of the preparation example referred to afterwards.

In FIG. 3, furthermore, there was shown an infrared absorption spectrum view.

Successively, 2.18 g, 0.005 mole, of the thus obtained tetrazonium salt and 0.01 mol of the coupler having the general formula (IV) were dissolved in 300 ml of DMF. Then, a solution dissolved 1.64 g of sodium acetate in 14 ml of water was dropped thereinto at room temperature for about 15 minutes. After completion of said dropping, it was stirred for additional 2 hours, and then separated crystals were filtered out. The resulting coarse crystal cake was dispersed in 300 ml of DMF and was stirred at 80° C. for 2 hours. Thereafter, crystals were again filtered out therefrom. This operation was repeated two times additionally. Then, the filtered crystals were washed with water and dried, thereby obtaining the disazo compound according to the present invention. The examples of the disazo compounds synthesized according to the above mentioned preparation example will be shown Table 14 and Table 15.

TABLE 14

| Compound No. | $R_1$ | $R_2$ | $R_3$ | $R_4$ | Elementary analysis value (calculated point) | | | Melting point (°C.) | Infrared absorption spectrum (KBr disc) | |
|---|---|---|---|---|---|---|---|---|---|---|
| | | | | | C % | H % | N % | | $\nu$NH(cm$^{-1}$) | $\nu$co(cm$^{-1}$) |
| 1-13 | H | H | H | H | 73.03 (73.27) | 3.75 (3.85) | 10.54 (10.68) | >300 | 3260 | 1675 |
| 1-1 | —OCH$_3$ | H | H | H | 70.84 (70.91) | 3.95 (4.05) | 9.94 (9.93) | >300 | 3250 | 1675 |
| 1-2 | H | —OCH$_3$ | H | H | 70.56 (70.91) | 3.94 (4.05) | 9.89 (9.93) | >300 | 3260 | 1680 |
| 1-3 | H | H | —OCH$_3$ | H | 70.96 (70.91) | 3.87 (4.05) | 9.95 (9.93) | >300 | 3270 | 1670 |
| 1-7 | —CH$_3$ | H | H | H | 73.54 (73.70) | 4.03 (4.21) | 10.13 (10.31) | >300 | 3260 | 1680 |
| 1-8 | H | —CH$_3$ | H | H | 73.65 (73.70) | 4.14 (4.21) | 10.11 (10.31) | >300 | 3270 | 1675 |
| 1-9 | H | H | —CH$_3$ | H | 73.26 (73.70) | 4.26 (4.21) | 10.61 (10.31) | >300 | 3300 | 1675 |
| 1-14 | —Cl | H | H | H | 67.39 (67.37) | 3.14 (3.30) | 9.82 (9.82) | >300 | — | 1680 |
| 1-15 | H | —Cl | H | H | 67.55 (67.37) | 3.14 (3.30) | 9.65 (9.82) | >300 | 3250 | 1680 |
| 1-16 | H | H | —Cl | H | 67.49 (67.37) | 2.99 (3.30) | 9.73 (9.82) | >300 | 3240 | 1675 |
| 1-17 | —Br | H | H | H | 61.11 (61.03) | 2.89 (2.99) | 8.91 (8.90) | >300 | — | 1680 |
| 1-18 | H | —Br | H | H | 61.05 (61.03) | 2.82 (2.99) | 8.73 (8.90) | >300 | 3240 | 1675 |
| 1-19 | H | H | —Br | H | 60.91 (61.03) | 2.93 (2.99) | 9.05 (8.90) | >300 | — | 1680 |
| 1-24 | H | —F | H | H | 69.85 (70.07) | 3.21 (3.43) | 10.10 (10.21) | >300 | 3260 | 1685 |
| 1-21 | H | —I | H | H | 55.80 (55.51) | 2.99 (2.72) | 8.15 (8.09) | >300 | 3250 | 1670 |
| 1-27 | H | —CF$_3$ | H | H | 64.98 (65.08) | 3.13 (3.05) | 8.90 (9.11) | >300 | 3270 | 1685 |
| 1-32 | —NO$_2$ | H | H | H | 65.64 (65.75) | 3.17 (3.22) | 12.82 (12.78) | >300 | — | 1675 |
| 1-33 | H | —NO$_2$ | H | H | 65.57 (65.75) | 3.20 (3.22) | 12.54 (12.78) | >300 | 3250 | 1675 |
| 1-34 | H | H | —NO$_2$ | H | 65.66 (65.75) | 3.16 (3.22) | 12.48 (12.78) | >300 | — | 1680 |
| 1-30 | H | —CN | H | H | 71.65 (71.76) | 3.11 (3.37) | 13.10 (13.40) | >300 | — | 1675 |
| 1-41 | —Cl | H | H | —Cl | 62.10 (62.35) | 2.71 (2.84) | 9.00 (9.09) | >300 | 3240 | 1675 |
| 1-42 | —CH$_3$ | H | H | —Cl | 67.59 (67.95) | 3.38 (3.65) | 9.41 (9.51) | >300 | 3250 | 1675 |
| 1-51 | —OCH$_3$ | H | —OCH$_3$ | —Cl | 63.91 (64.00) | 3.59 (3.72) | 8.44 (8.61) | >300 | 3250 | 1670 |

TABLE 15

Structure: A—N=N—[anthraquinone]—N=N—A

| Compound No. | A | Elementary analysis value (calculated point) | | | Melting point (°C.) | Infrared absorption spectrum (KBr disc) | |
|---|---|---|---|---|---|---|---|
| | | C % | H % | N % | | $\nu$NH(cm$^{-1}$) | $\nu$co(cm$^{-1}$) |
| 1-56 | [3-hydroxy-N-(2-methoxyphenyl)-6-bromo-2-naphthamide group] | 59.66 (59.77) | 3.27 (3.21) | 8.53 (8.37) | >300 | 3250 | 1670 |
| 1-57 | [3-hydroxy-N-(2-methoxydibenzofuranyl)-2-naphthamide group] | 72.31 (72.51) | 3.53 (3.73) | 7.99 (8.18) | >300 | 3245 | 1675 |
| 1-58 | [3-hydroxy-N-(2-methylphenyl)-2-anthramide group] | 75.93 (76.13) | 4.11 (4.19) | 9.01 (9.19) | >300 | 3255 | 1675 |
| 1-60 | [3-hydroxy-N-(methoxyphenyl)-carbazole carboxamide group] | 72.59 (72.65) | 3.85 (3.93) | 10.66 (10.93) | >300 | 3300 3460 | 1670 |

TABLE 15-continued

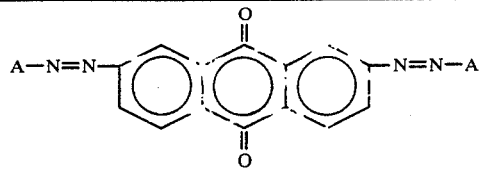

| Compound No. | A | Elementary analysis value (calculated point) | | | Melting point (°C.) | Infrared absorption spectrum(KBr disc) | |
|---|---|---|---|---|---|---|---|
| | | C % | H % | N % | | νNH(cm$^{-1}$) | νco(cm$^{-1}$) |
| 1-62 | [structure: OCH3, HO, CONH, OCH3, O, phenyl groups] | 68.01 (68.15) | 3.73 (3.88) | 8.52 (8.52) | >300 | 3250 | 1675 |

Figure 4:
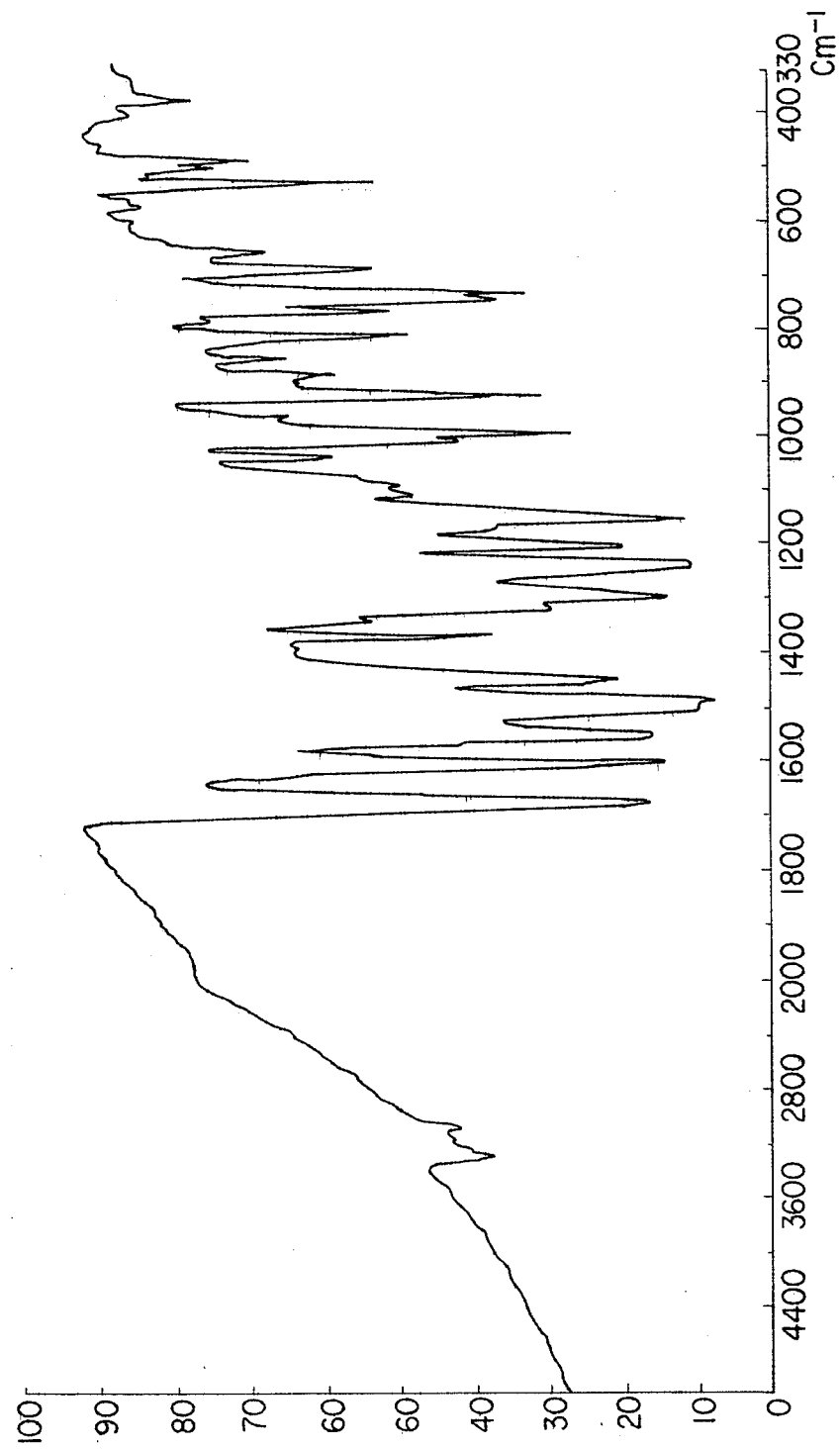
FIG. 4 is a view illustrating infrared absorption spectrums (KBr tablet method) of a typical disazo compound according to the present invention.

These disazo compounds take the form of red or reddish purple powder at room temperature. FIG. 4 indicates infrared absorption spectrums (KBr tablet method) of the typical disazo compounds expressed by Compound No. 1-13 according to the present invention.

EXAMPLE 1

76 parts by weight of disazo compound No. 1-13, 1260 parts by weight of polyester resin [VYLON 200: produced by TOYO BOSEKI K.K. (solid concentration: 2%) and 3700 parts by weight of tetrahydrofuran were pulverized and mixed in a ball mill. The resulting dispersion was applied onto the aluminum face of an aluminum-vapordeposited polyester base (electrically conductive substrate) by means of doctor blade, and same was air-dried to thereby form an about 1 μm-thick charge carrier generating layer.

Figure 1:
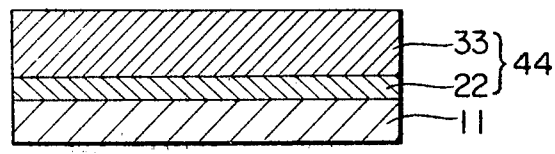
FIG. 1 is a grossly enlarged sectional view of an electrophotographic element embodying the present invention.

On the other hand, 2 parts by weight of charge transfer substance No. 2-327, 2 parts by weight of polycarbonate resin (Panlite K 1300: produced by TEIJIN K.K.) and 16 parts by weight of tetrahydrofuran were mixed and dissolved to obtain a solution. Then, this solution was applied onto said charge carrier generating layer by means of a doctor blade, dried at 80° for 2 minutes and then dried at 100° C. for 5 minutes, thereby forming an about 20 μm-thick charge transfer layer. Thus, the multilayer type element No. 1 illustrated in FIG. 1 was prepared.

EXAMPLES 2 TO 39

The same procedure as Example 1 was followed except that the disazo compound No. 1-13 and charge transfer substance No. 2-327 employed in Example 1 were replaced by the disazo compounds and charge transfer substances shown in Table 1 referred to afterwards to thereby prepare Elements No. 2 to 39.

These Elements No. 1 to 39 were subjected to −6 KV corona discharge for 20 seconds by means of an electrostatic copying paper tester (SP 428 TYPE: produced by Kawaguchi Electro Works) and charged negatively. Thereafter, these elements were left standing in the dark for 20 seconds to measure the surface potential Vpo(V) at that time. In succession, said elements were exposed to radiation of light from a tungsten lamp so that the intensity of illumination on their surfaces may be 20 lux. The time (seconds) required until the surface potential was reduced to ½ of Vpo was found out and the exposure amount E½ (lux.sec) was calculated therefrom on each element.

The thus obtained results are shown in Table 16.

TABLE 16

| Element No. | Disazo Compound No. | Charge transfer substance No. | Vpo (volt) | E½ (lux · sec) |
|---|---|---|---|---|
| 1 | 1-13 | 2-327 | −352 | 11.4 |
| 2 | 1-1 | 2-327 | −438 | 10.3 |
| 3 | 1-7 | 2-5 | −1182 | 8.8 |
| 4 | 1-8 | 2-5 | −1113 | 10.7 |
| 5 | 1-14 | 2-169 | −1339 | 7.4 |
| 6 | 1-14 | 2-213 | −1073 | 7.5 |
| 7 | 1-14 | 2-5 | −1085 | 4.9 |
| 8 | 1-15 | 2-169 | −1039 | 5.1 |
| 9 | 1-15 | 2-213 | −769 | 4.5 |
| 10 | 1-15 | 2-5 | −817 | 3.4 |
| 11 | 1-16 | 2-213 | −765 | 11.4 |
| 12 | 1-16 | 2-327 | −169 | 3.0 |
| 13 | 1-16 | 2-5 | −888 | 8.5 |
| 14 | 1-17 | 2-213 | −935 | 10.3 |
| 15 | 1-17 | 2-327 | −300 | 3.9 |
| 16 | 1-17 | 2-5 | −1130 | 8.0 |
| 17 | 1-18 | 2-169 | −1098 | 6.5 |
| 18 | 1-18 | 2-213 | −985 | 5.8 |
| 19 | 1-18 | 2-5 | −807 | 2.6 |
| 20 | 1-19 | 2-169 | −1211 | 10.8 |
| 21 | 1-29 | 2-5 | −951 | 8.5 |
| 22 | 1-30 | 2-5 | −891 | 3.3 |
| 23 | 1-31 | 2-5 | −738 | 4.2 |
| 24 | 1-27 | 2-5 | −640 | 8.8 |
| 25 | 1-32 | 2-5 | −990 | 7.8 |
| 26 | 1-33 | 2-169 | −1138 | 5.3 |
| 27 | 1-33 | 2-213 | −831 | 5.0 |
| 28 | 1-33 | 2-5 | −832 | 3.0 |
| 29 | 1-34 | 2-5 | −528 | 4.9 |
| 30 | 1-45 | 2-5 | −938 | 7.3 |
| 31 | 1-42 | 2-5 | −428 | 4.9 |
| 32 | 1-41 | 2-5 | −894 | 5.3 |

TABLE 16-continued

| Element No. | Disazo Compound No. | Charge transfer substance No. | Vpo (volt) | $E_{\frac{1}{2}}$ (lux · sec) |
|---|---|---|---|---|
| 33 | 1-46 | 2-327 | −326 | 13.3 |
| 34 | 1-58 | 2-5 | −711 | 7.5 |
| 35 | 1-60 | 2-5 | −633 | 3.2 |
| 36 | 1-20 | 2-5 | −1133 | 7.0 |
| 37 | 1-21 | 2-5 | −861 | 4.0 |
| 38 | 1-23 | 2-5 | −942 | 8.0 |
| 39 | 1-24 | 2-5 | −1120 | 4.1 |

COMPARATIVE EXAMPLE 1

The multilayer type element disclosed in U.S. Pat. No. 3,871,882, wherein a perylene derivative is incorporated in the charge carrier generating layer and an oxadiazole derivative is incorporated in the charge transfer layer, was prepared in the undermentioned manner.

N,N'-dimethylperylene-3,4,9,10-tetracarboxylic acid diimide was used as the charge carrier generating substance, and same was vacuum vapordeposited on an aluminum plate under the conditions: degree of vacuum $10^{-5}$, vapordeposition source temperature 300° C. and vapordeposition time 3 minutes to thereby form the charge carrier generating layer. In succession, a solution comprising 5 parts by weight of 2,5-bis(4-diethylaminophenyl)-1,3,4-oxadiazole,, 5 parts by weight of polyester resin (Polyester Adhesive 49000, produced by Du Pont Co.) and 90 parts by weight of tetrahydrofuran was applied on the resulting charge carrier generating layer, and dried at 120° C. for 10 minutes to thereby form the charge transfer layer having a thickness of about 10 μm. Thus, Comparative element No. 1 was prepared.

COMPARATIVE EXAMPLE 2

The multilayer type element disclosed in Japanese Patent Publication No. 42380/1980, wherein Chloro Dian Blue was incorporated in the charge carrier generating layer and a hydrazone compound was incorporated in the charge transfer layer, was prepared in the undermentioned manner.

A solution comprising 25 parts by weight of Chloro Dian Blue, 1240 parts by weight of ethylene diamine, 990 parts by weight of n-butylamine and 2740 parts by weight of tetrahydrofuran was applied on the aluminum face of an aluminum-vapordeposited polyester base with a 25μ wet gap by means of a doctor blade and dried to thereby form the charge carrier generating layer. In succession, a solution comprising 10 parts by weight of 4-diethylaminobenzaldehyde 1,1-diphenylhydrazone, 10 parts by weight of polycarbonate resin (the same as the resin employed in Example 1) and 80 parts by weight of tetrahydrofuran was applied on the thus formed charge carrier generating layer by means of a doctor blade and dried to thereby form the charge transfer layer having a thickness of about 18μ. Thus, Comparative element No. 2 was prepared.

COMPARATIVE EXAMPLE 3

The multilayer type element disclosed in Japanese Laid Open patent application 84943/1980, wherein a distyrylbenzene type disazo compound was incorporated in the charge carrier generating layer and a hydrazone compound was incorporated in the charge transfer layer, was prepared in the undermentioned manner.

20 parts by weight of 4',4'''-bis[2-hydroxy-3-(2,4-dimethylphenylcarbamoyl)-1-naphthylazo]-1,4-distyrylbenzene, 3 parts by weight of polyvinylbutyral (Denka Butyral #4000-1, produced by Tokyo Denki Kagaku K.K.), 7 parts by weight of polymethyl methacrylate (DIANAL BR-80, produced by Mitsubishi Rayon K.K.) and 300 parts by weight of tetrahydrofuran were ball-milled for 3 hours to thereby obtain a dispersion. This dispersion was diluted with 2700 parts by weight of tetrahydrofuran. Thereafter, this dispersion was applied on the aluminum face of an aluminum-vapordeposited polyester base (electrically conductive substrate) by means of a doctor blade and dried to thereby form an about 0.3 μ-thick charge carrier generating layer. In succession, a solution comprising 10 parts by weight of 1-methyl-1-phenylhydrazone, 10 parts by weight of polycarbonate resin (the same resin as employed in Example 1) and 80 parts by weight of tetrahydrofuran was applied on said charge carrier generating layer and dried to thereby form an about 13 μ-thick charge transfer layer. Thus, Comparative multilayer type element No. 3 was prepared.

For the purpose of measuring the sensitive wavelengths for these comparative elements No. 1 to 3 and the elements No. 10 and 19 of the present invention, said elements were subjected to spectral sensitivity measurement in accordance with the following procedure.

Figure 2:
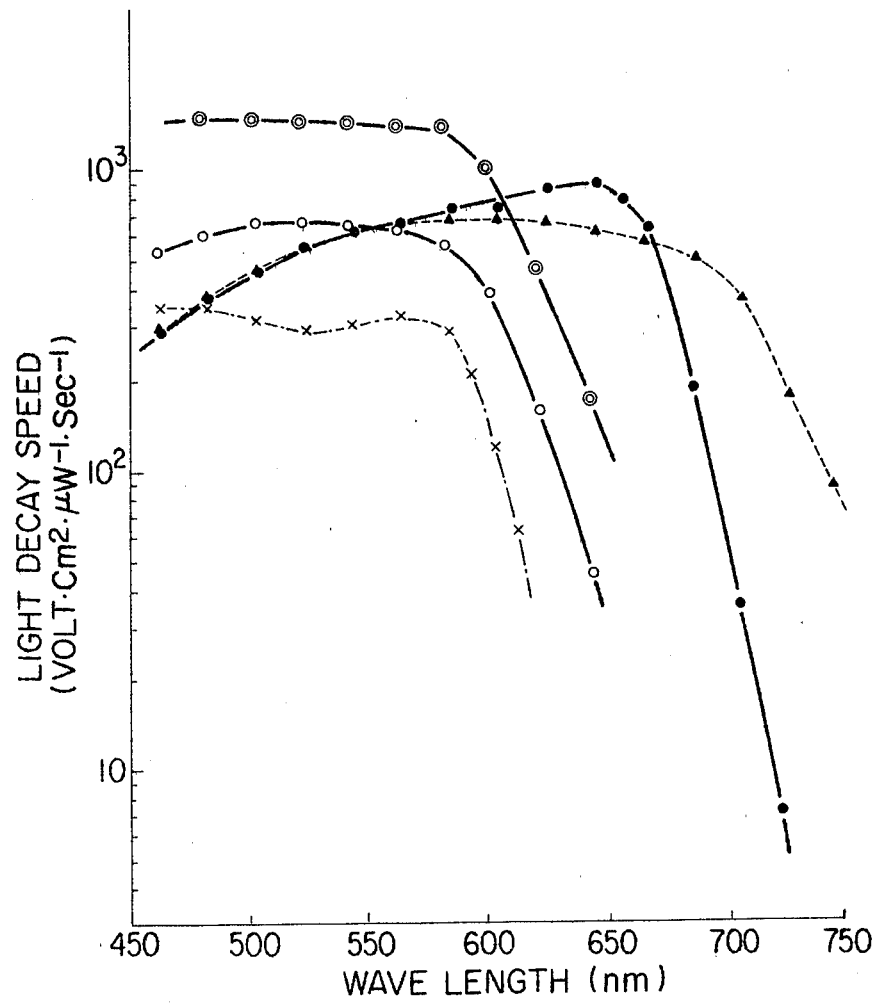
FIG. 2 is a graph illustrating spectral sensitivity characteristics of the element of the present invention and the comparative elements.

First, each element was charged by corona discharge in the dark so that its surface potential become more than −800 V, and then subjected to dark decay until the surface potential become −800 V. When the surface potential became −800 V, the element was exposed to a monochromatic spectrum obtained by means of a monochrometer, its intensity of illumination on the element being 1 μW/cm². The time required until the surface potential decayed to −400 V was found out, and the half decay exposure amount (μW·sec/cm²) was calculated therefrom. On the other hand, the potential difference to be obtained actually by the exposure was found out by subtracting the dark decayed potential portion from the apparent potential difference 400 V to be obtained by the exposure. Then, the light decay speed (Volt·cm²·μW⁻¹·sec⁻¹) was calculated from the actual potential difference and half decay exposure amount and named sensitivity. The thus obtained results were shown in FIG. 2

| | |
|---|---|
| -o-o- | Element No. 10 |
| - - - | Element No. 19 |
| -x-x- | Comparative Element No. 1 |
| -●-●- | Comparative Element No. 2 |
| - - - | Comparative Element No. 3 |

COMPARATIVE EXAMPLES 4 and 5

For comparisons' sake, Comparative elements No. 4 and No. 5 were prepared respectively by repeating the same procedure as employed in the preparation of the above element of the present invention except that the disazo compound of the present invention was replaced by (1) 4,4'-bis(2-hydroxy-3-phenylcarbamoyl-1-naphthylazo)-3,3'-dichlorodiphenyl (Chloro Dian Blue) coming under the benzidine type disazo compounds disclosed in the above mentioned Japanese Laid Open patent applications 37543/1970 and 55643/1977, and (2) 4,4'-bis(2-hydroxy-3-phenylcarbamoyl-1-naphthylazo) stilbene coming under the stilbene type disazo compounds disclosed in Japanese Laid Open patent application 8832/1977, respectively.

The thus prepared comparative elements No. 4 and No. 5 together with the element No. 19 according to the present invention were subjected to electrostatic characteristic measurement by means of a commercially available electrostatic copying paper tester (SP-428 TYPE, produced by Kawaguchi Electro Works). In more detail, said elements were first subjected to −6 KV corona discharge for 20 seconds and charged negatively to thereby measure the surface potential at that time and find out Vdo (V). Then, the said elements were left standing in the dark for 20 seconds for dark decay purpose to thereby measure the surface potential at that time and find out Vdo (V). In succession, the elements were exposed to radiation of light from a tungsten lamp so that the intensity of illumination on their surfaces may be 20 lux. And, the time required until the surface potential was reduced to ½ of Vpo was found out and named the exposure amount E½ (lux·sec). Likewise, the time required until the surface potential Vpo was reduced to 1/5 and 1/10 were found out respectively, and then the exposure amount E1/5 (lux·sec) and the surface amount E1/10 (lux·sec) were calculated therefrom respectively. The obtained results were shown in Table 17.

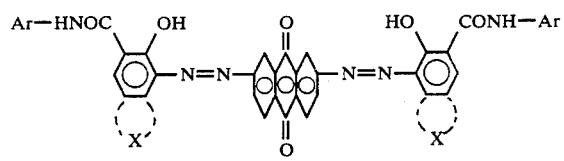

TABLE 17

| Element | Vdo (V) | Vpo (V) | Vpo/Vdo | E½ (lux · sec) | E1/5 (lux · sec) | E1/10 (lux · sec) |
|---|---|---|---|---|---|---|
| Our element No. 19 | −1223 | −690 | .564 | 2.3 | 4.2 | 5.3 |
| Comparative element No. 4 | −940 | −693 | .738 | 5.9 | 12.3 | 16.7 |
| Comparative element No. 5 | −1817 | −1501 | .826 | 19.3 | 51.0 | 75.0 |

It can be seen from the above results that the element using the disazo compound according to the present invention is high in sensitivity and its visible light wavelengths cover the range of about 460 to 600 nm. Accordingly, the element according to the present invention is superior in the reproductivity of red image and so can dispense with a red filter when actually set in a copying machine.

Further, as the preparation of the electrophotographic element according to the present can dispense with the necessity of employing the vacuum vapor-deposition as used in the preparation of said comparative element No. 1 or using the organic amine as used in the preparation of said comparative element No. 2, the element of the present invention should be said profitable from the viewpoint of production.

Still further, the elements Nos. 10 and 19 of the present invention were each subjected to 10,000 times repeated reproduction by means of a copying machine RICOPY P-500 manufactured by RICOH COMPANY, LTD. As the result, each element was found to produce a clear-cut image. It may be understood therefrom that the elements of the present invention are extremely superior in durability.

What is claimed is:

1. A multilayer type electrophotographic element comprising a charge carrier generating layer and a charge transfer layer formed on an electrically conductive substrate, wherein said charge carrier generating layer contains a disazo compound having the general formula (I):

wherein X is a substituted or unsubstituted aromatic ring or hetero ring, and Ar is a substituted or unsubstituted aromatic ring or hetero ring.

2. An electrophotographic element according to claim 1 wherein said charge carrier generating layer is formed on said electrically conductive substrate and said charge transfer layer is formed on said charge carrier generating layer.

3. An electrophotographic element according to claim 1 wherein charge carrier generating layer is 0.01–5 μm thick and charge transfer layer is 2–100 μm thick.

4. An electrophotographic element according to claim 3 wherein charge carrier generating layer is 0.05–2 μm thick and charge transfer layer is 5–40 μm thick.

5. An electrophotographic element according to claim 1 wherein charge carrier generating layer contains 10–100 wt.% of said disazo compound.

6. An electrophotographic element according to claim 1 wherein charge transfer layer contains 10–80 wt.% of a charge transfer substance.

7. An electrophotographic element according to claim 1 wherein X in the general formula (I) is a substituted or unsubstituted benzene ring, naphthalene ring, indole ring, carbazole ring or benzofuran ring, and Ar in the general formula (I) is a substituted or unsubstituted benzene ring, naphthalene ring, dibenzofuran ring or carbazole ring.

8. An electrophotographic element according to claim 1 wherein at least one of X and Ar in the general formula (I) is substituted by a lower alkyl group having 1–4 carbon atoms, a lower alkoxy group having 1–4 carbon atoms, a halogen atom, a halomethyl group, a lower alkylestercarboxyl group, a lower alkylamino group, a cyano group, a nitro group or a sulfonate group.

9. An electrophotographic element according to claim 7 wherein at least one of X and Ar in the general formula (I) is substituted by a lower alkyl group having 1–4 carbon atoms, a lower alkoxy group having 1–4 carbon atoms, a halogen atom, a halomethyl group, a lower alkylestercarboxyl group, a lower alkylamino group, a cyano group, a nitro group, or a sulfonate group.

10. A compound represented by the general formula (II):

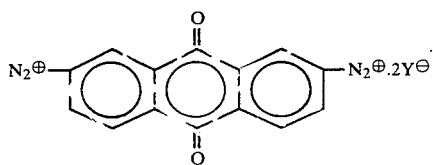

wherein Y is an anion functional group

11. A compound according to claim 10 wherein Y is Cl⊖, Br⊖, I⊖, BF₄⊖, PF₆⊖,

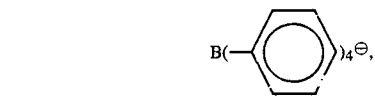

ClO₄⊖, SO₄²⊖,

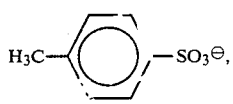

AsF₆⊖ or SbF₆⊖.

12. A compound according to claim 10 wherein Y is BF₄⊖.

13. A compound represented by the general formula (I):

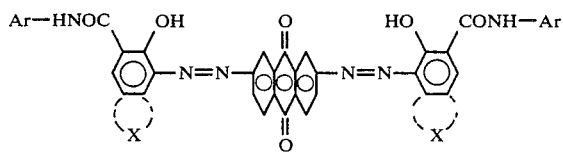

wherein X is a substituted or unsubstituted aromatic ring or hetero ring, and Ar is a substituted or unsubstituted aromatic ring or hetero ring.

14. A compound according to claim 13 wherein X in the general formula (I) is a substituted or unsubstituted benzene ring, naphthalene ring, carbazole ring or benzofuran ring, and Ar in the general formula (I) is a substituted or unsubstituted benzene ring, naphthalene ring, dibenzofuran ring or carbazole ring.

15. A compound according to claim 13 wherein at least one of X and Ar in the general formula (I) is substituted by a lower alkyl group having 1-4 carbon atoms, a lower alkoxy group having 1-4 carbon atoms, a halogen atom, a halomethyl group, a lower alkylestercarboxyl group, a lower alkylamino group, a cyano group, a nitro group or a sulfonate group.

16. An electrophotographic element including a charge carrier generating layer and a charge transfer layer formed on an electrically conductive substrate, said charge generating layer being interposed between said substrate and said charge transfer layer, wherein the improvement comprises:

said charge carrier generating layer has a thickness in the range of 0.01–5 μm and consists essentially of 10 to 100 wt.% of a disazo compound having the formula:

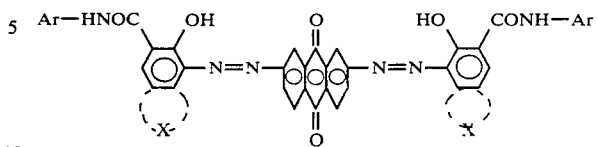

wherein X is a substituted or unsubstituted benzene, naphthalene, indole, carbazole or benzofuran ring and Ar is a substituted or unsubstituted benzene, naphthalene, dibenzofuran or carbazole ring; and said charge transfer layer has a thickness in the range of 2–100 μm and consists essentially of 10–80 wt.% of a charge transfer substance selected from the group consisting of:

(1) hydrazone compounds having the formula:

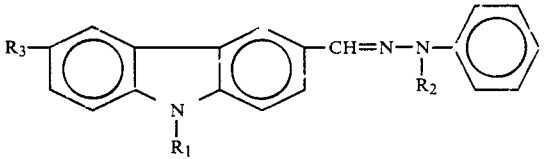

wherein $R_1$ is methyl, ethyl, 2-hydroxyethyl or 2-chloroethyl, $R_2$ is methyl, ethyl, benzyl or phenyl, and $R_3$ is hydrogen, chlorine, bromine, $C_1$ to $C_4$ alkyl, $C_1$ to $C_4$ alkoxy, dialkylamino or nitro;

(2) diaryl methane compounds having the formula:

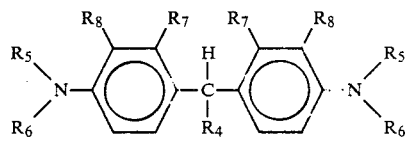

wherein $R_4$ is $C_1$ to $C_{11}$ alkyl, substituted or unsubstituted phenyl or a heterocyclic group, each of $R_5$ and $R_6$, which may be same or different, is hydrogen, $C_1$ to $C_4$ alkyl, hydroxyalkyl, chloroalkyl, substituted or unsubstituted aralkyl, or $R_5$ and $R_6$ may combine to form a nitrogen-containing heterocyclic ring, each of $R_7$ and $R_8$, which may be same or different, is hydrogen, $C_1$ to $C_4$ alkyl, $C_1$ to $C_4$ alkoxy or halogen;

(3) anthracene compounds having the formula:

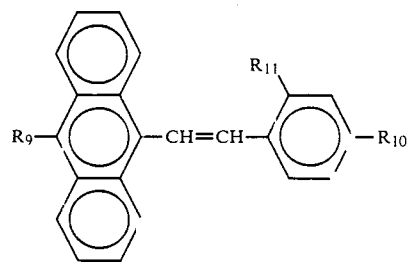

wherein $R_9$ is hydrogen or halogen, $R_{10}$ is hydrogen, $C_1$ to $C_4$ alkyl, $C_1$ to $C_4$ alkoxy, dialkylamino or substituted or unsubstituted diaralkylamino, and $R_{11}$ is hydrogen, $C_1$ to $C_4$ alkyl or halogen; and (4) pyrazoline compounds having the general formula:

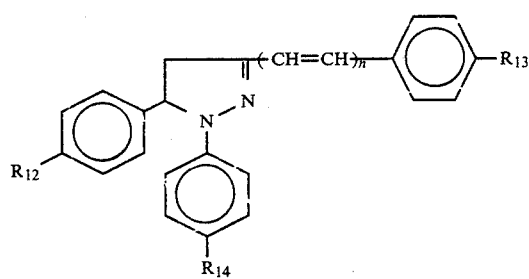

wherein each of $R_{12}$, $R_{13}$ and $R_{14}$, which can be the same or different, is hydrogen, $C_1$ to $C_4$ alkyl, $C_1$ to $C_4$ alkoxy, dialkylamino or halogen, and n is 0 or 1; and the balance is essentially a binder.

17. An electrophotographic element as claimed in claim 16, wherein said charge transfer substance is selected from said compounds (1) and (2).

18. An electrophotographic element as claimed in claim 17, wherein said disazo compound (I) has the formula:

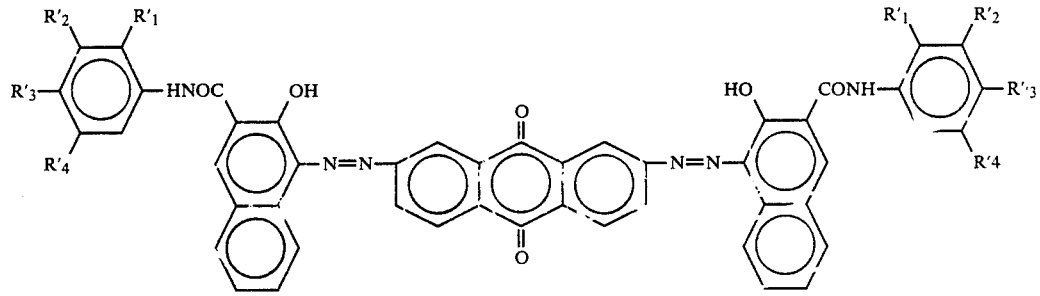

wherein each of $R'_1$, $R'_2$, $R'_3$ and $R'_4$, which can be the same or different, is selected from hydrogen, $-OCH_3$, $-OC_2H_5$, $-CH_3$, $-C_2H_5$, Cl, Br, F, I, $-CF_3$, $-CN$, $-NO_2$, $-COOH$, $-COOC_2H_5$, $-N(CH_3)_2$, $-SO_3Na$, and tert-$OC_4H_9$.

19. An electrophotographic element as claimed in claim 18, wherein at least one of $R'_1$, $R'_2$, $R'_3$ and $R'_4$ is not hydrogen.

20. An electrophotographic element as claimed in claim 19, wherein said charge transfer substance consists essentially of:

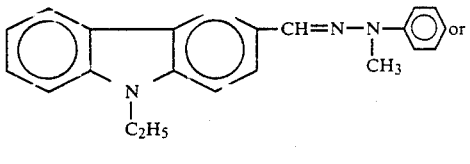

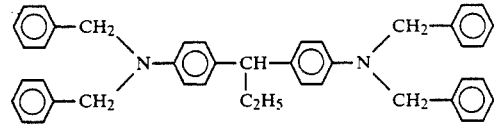

* * * * *

UNITED STATES PATENT AND TRADEMARK OFFICE
CERTIFICATE OF CORRECTION

PATENT NO. : 4 486 522
DATED : December 4, 1984
INVENTOR(S) : Mitsuru Hashimoto

It is certified that error appears in the above-identified patent and that said Letters Patent is hereby corrected as shown below:

Column 66, line 21; after "wherein" insert ---said---.
line 22; after "and" insert ---said---.
line 25; after "wherein" insert ---said---.
line 36; after "and" insert ---said---.
line 39; after "wherein" insert ---said---.
line 42; after "wherein" insert ---said---.
Column 67, line 12; change to read as follows:
$---Cl^{\ominus}, Br^{\ominus}, I^{\ominus}, BF_4^{\ominus}, PF_6^{\ominus}, ---$.

Signed and Sealed this

Fifteenth Day of October 1985

[SEAL]

Attest:

DONALD J. QUIGG

Attesting Officer

Commissioner of Patents and
Trademarks—Designate